United States Patent
Abe et al.

(10) Patent No.: US 7,773,194 B2
(45) Date of Patent: Aug. 10, 2010

(54) LIQUID CRYSTAL DISPLAY DEVICE

(75) Inventors: Makoto Abe, Sendai (JP); Tsutomu Tanaka, Sendai (JP); Makoto Tsumura, Hitachi (JP)

(73) Assignee: Future Vision Inc., Tokyo (JP)

( * ) Notice: Subject to any disclaimer, the term of this patent is extended or adjusted under 35 U.S.C. 154(b) by 863 days.

(21) Appl. No.: 11/668,501

(22) Filed: Jan. 30, 2007

(65) Prior Publication Data

US 2008/0024701 A1    Jan. 31, 2008

(30) Foreign Application Priority Data

Jul. 28, 2006    (JP) .............................. 2006-206683

(51) Int. Cl.
G02F 1/13    (2006.01)
(52) U.S. Cl. .................................................... 349/187
(58) Field of Classification Search ........................ None
See application file for complete search history.

(56) References Cited

U.S. PATENT DOCUMENTS 7,371,625 B2 *    5/2008    Yamazaki et al. ............ 438/158
7,462,514 B2 *    12/2008    Shiroguchi et al. ........... 438/149
7,531,294 B2 *    5/2009    Yamamoto et al. ............ 430/311
2005/0158665 A1 *    7/2005    Maekawa et al. ............ 430/313
2005/0247978 A1 *    11/2005    Weng et al. ................. 257/347

* cited by examiner

*Primary Examiner*—Timothy Rude
(74) *Attorney, Agent, or Firm*—Antonelli, Terry, Stout & Kraus, LLP.

(57) ABSTRACT

The present invention provides a liquid crystal display device with high brightness and high display quality manufactured at low cost without causing the decrease in transmissivity. The liquid crystal display device comprises a gate line GL with a gate electrode GT of thin-film transistor prepared on a first substrate SUB1 and used for applying a scan signal, a gate insulator film GI deposited to cover the gate line, a semiconductor layer nS/S formed in island-like shape on the gate insulator film and to constitute an active layer of the thin-film transistor, a source electrode SD1 and a drain electrode SD2 arranged on the gate insulator film and individually connected to said semiconductor layer, and a pixel electrode PX connected to the drain electrode SD2 wherein the gate line GL and the gate electrode GT, the source electrode SD1, the drain electrode SD2, and the pixel electrode PX are prepared by ink jet coating of a conductive solution in a region enclosed by banks G-BNK, SD-BNK, and P-BNK of the insulator film and by baking. Each of these banks is arranged only in a region where it is concealed by the light shielding film BM on the second substrate SUB2.

13 Claims, 28 Drawing Sheets

《Structure in cross-sectional view》

《Structure in plan view》

《Structure in cross-sectional view》

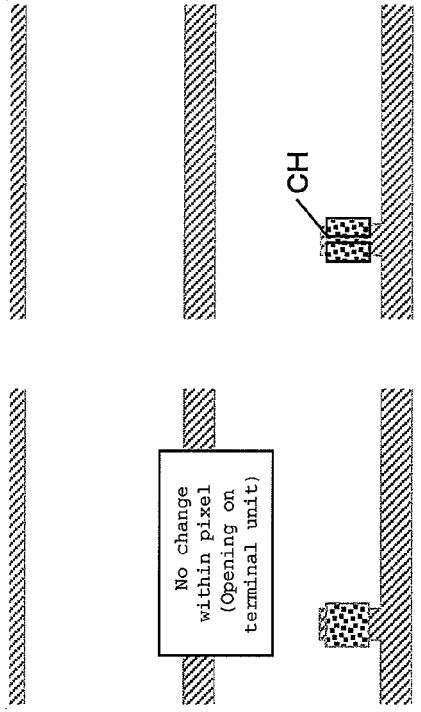
FIG.6(a) <<1st layer: gate>>
FIG.6(b) <<2nd layer: semiconductor>>
FIG.6(c) No change within pixel (Opening on terminal unit) <<3rd layer: contact hole>>
FIG.6(d) <<4th layer: channel>>
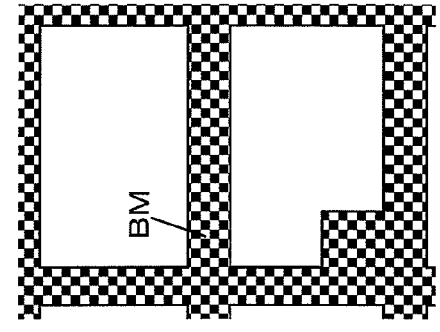
FIG.6(e) <<5th layer: protective film>>
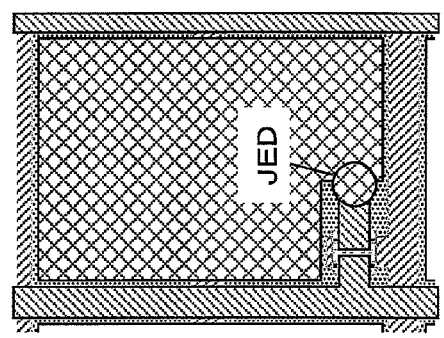
FIG.6(f) <<6th layer: SD + pixel>>
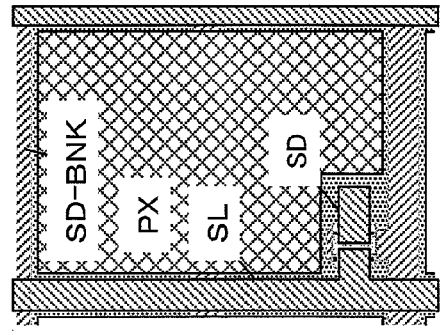
FIG.6(g) <<7th layer: connection electrode>>
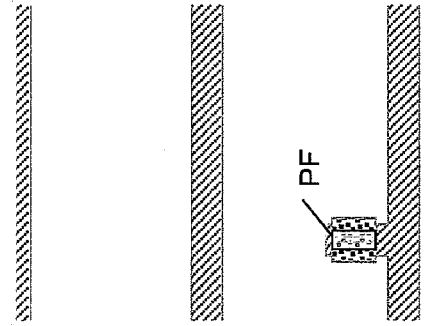
FIG.6(h) <<Counter substrate>>

<<Structure in plan view>>

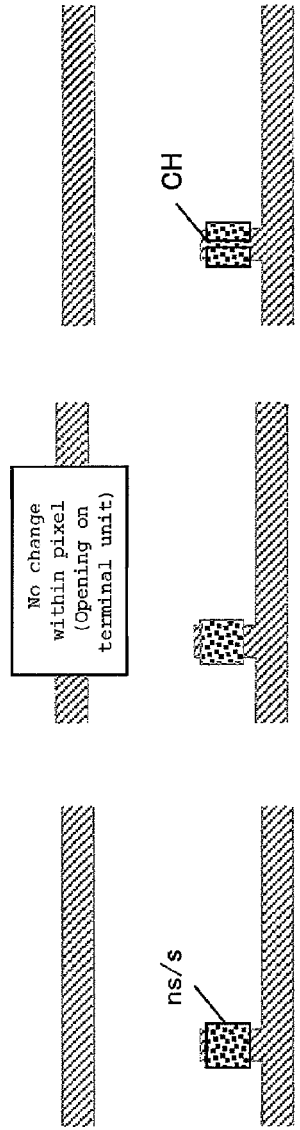
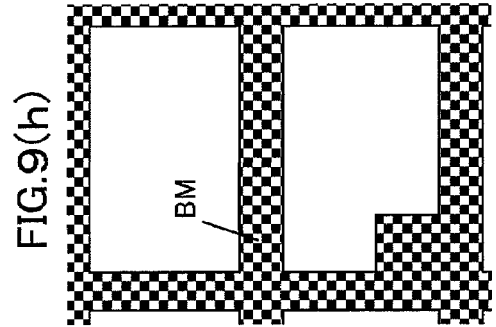
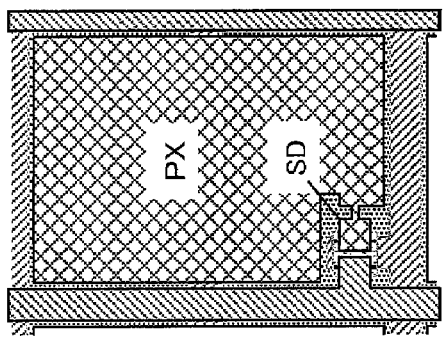
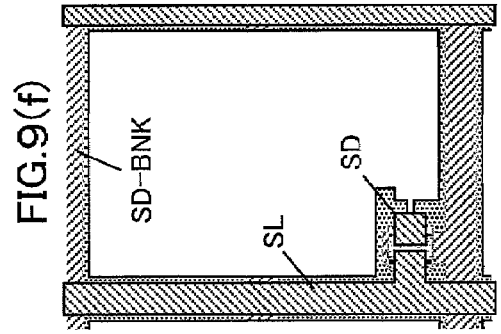
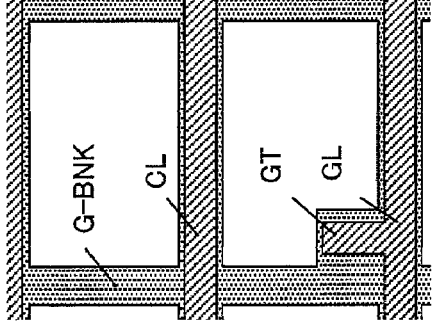
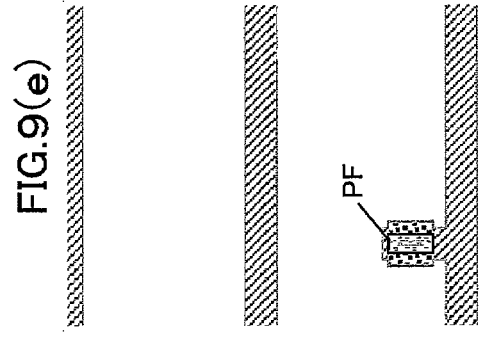
FIG.9(a) <<1st layer: gate>>
FIG.9(b) <<2nd layer: semiconductor>>
FIG.9(c) <<3rd layer: contact hole>>
FIG.9(d) <<4th layer: channel>>
FIG.9(e) <<5th layer: protective film>>
FIG.9(f) <<6th layer: SD>>
FIG.9(g) <<7th layer: pixel>>
FIG.9(h) <<Counter substrate>>

《Structure in plan view》

《Structure in cross-sectional view》

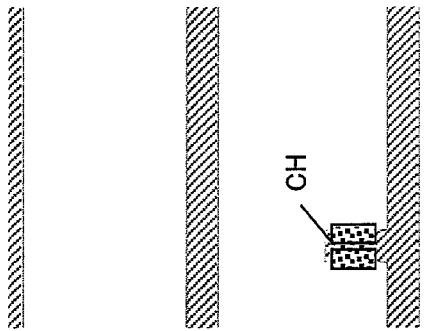
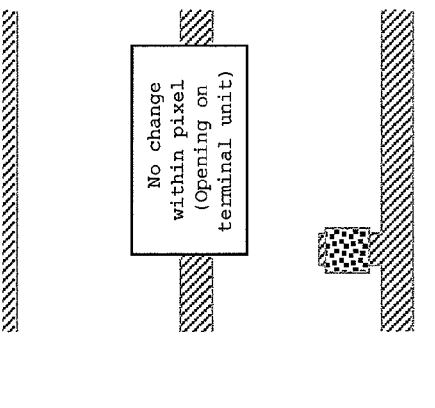
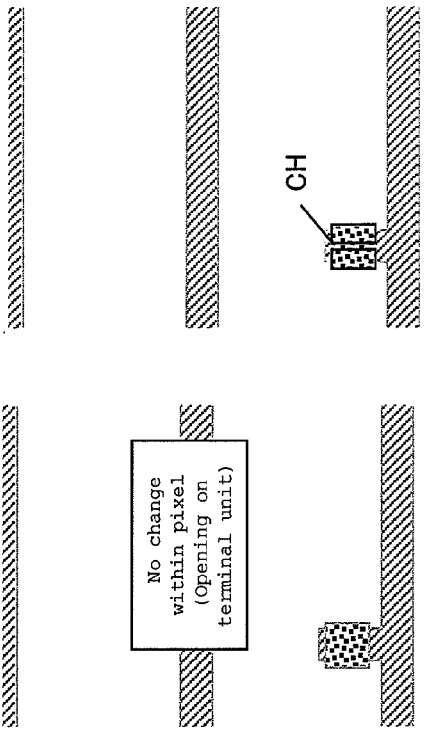
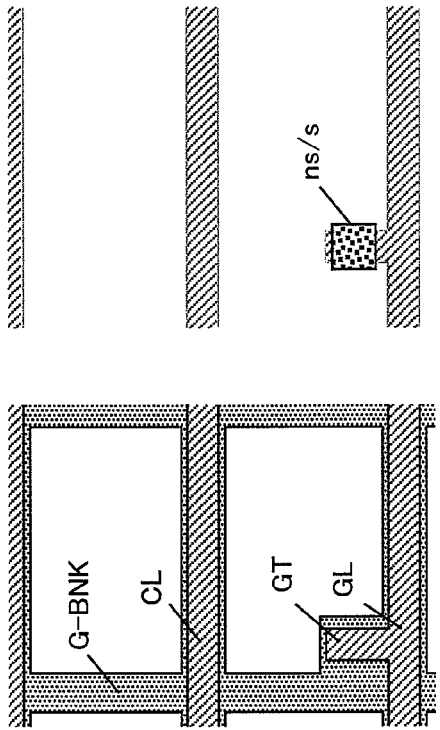
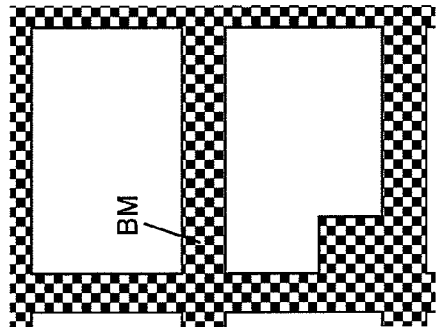
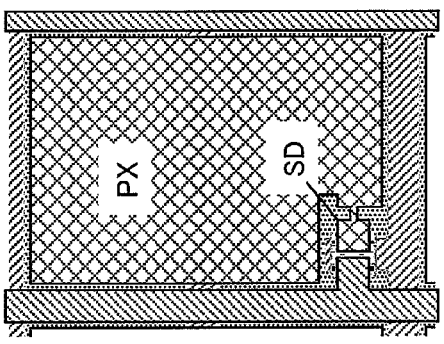
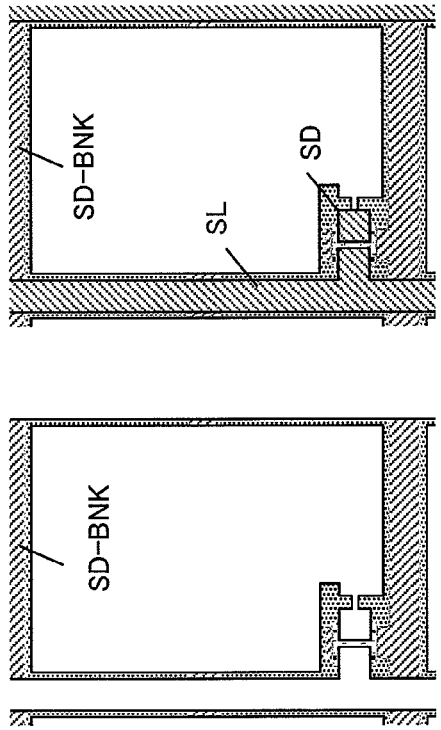
FIG. 14

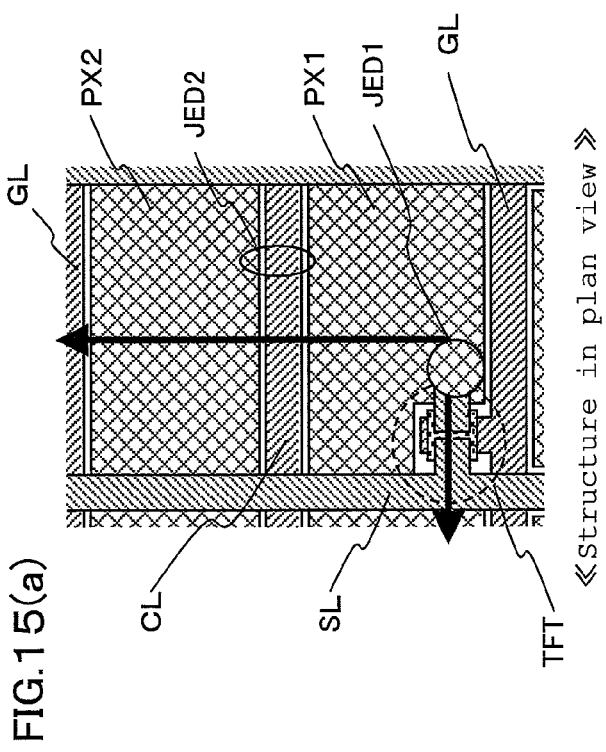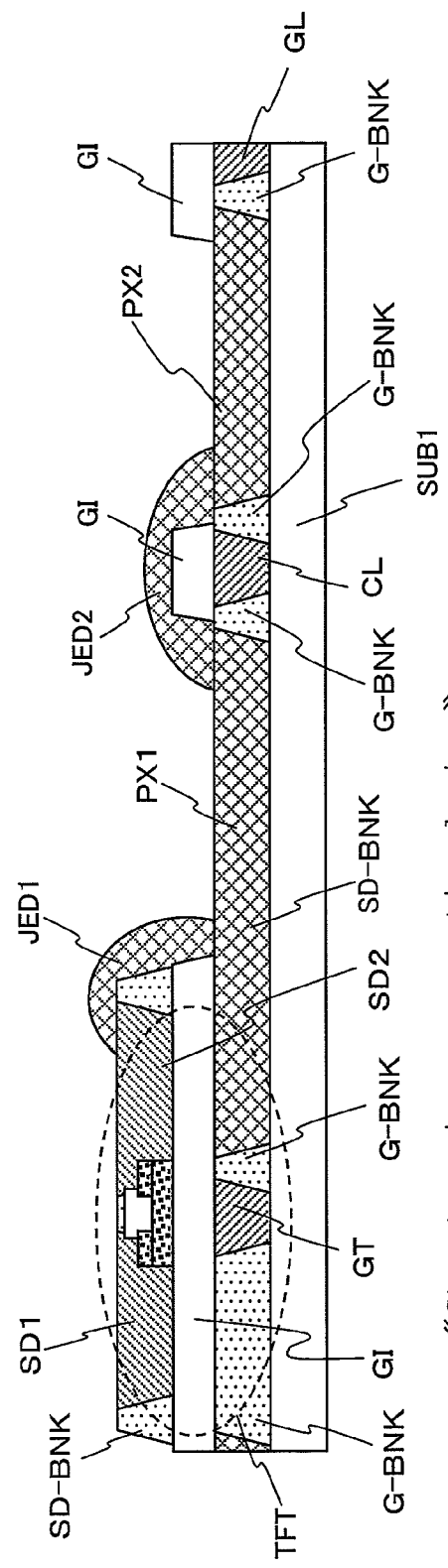

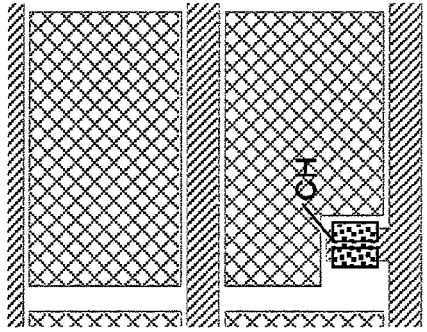
FIG.17(a)  《1st layer: gate + pixel》
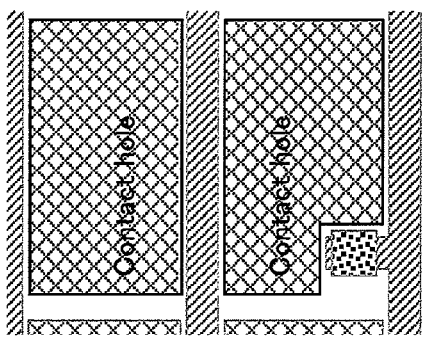
FIG.17(b)  《2nd layer: semiconductor》
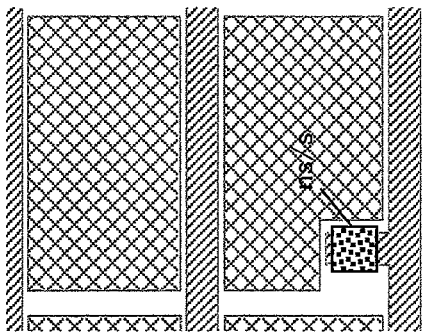
FIG.17(c)  《3rd layer: contact hole》
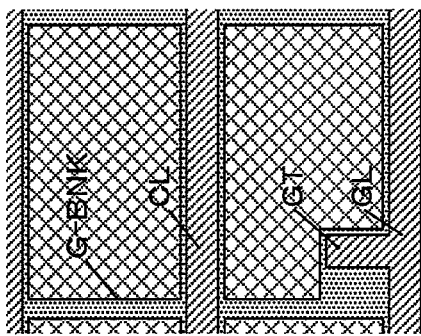
FIG.17(d)  《4th layer: channel》
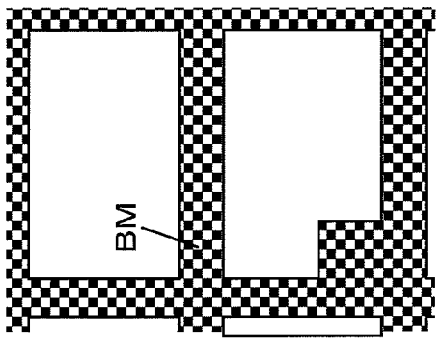
FIG.17(e)  《5th layer: protective film》
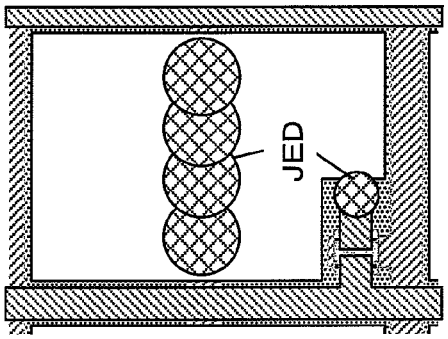
FIG.17(f)  《6th layer: SD》
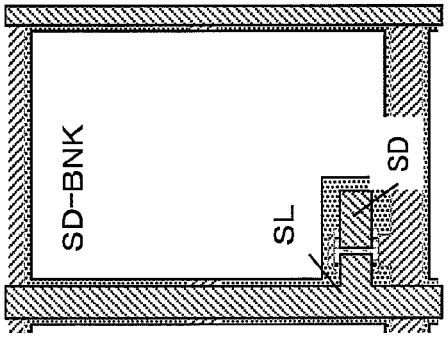
FIG.17(g)  《7th layer: connection electrode》
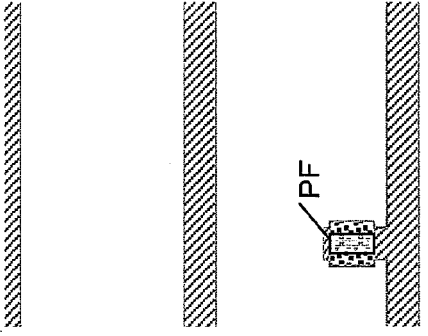
FIG.17(h)  《Counter substrate》

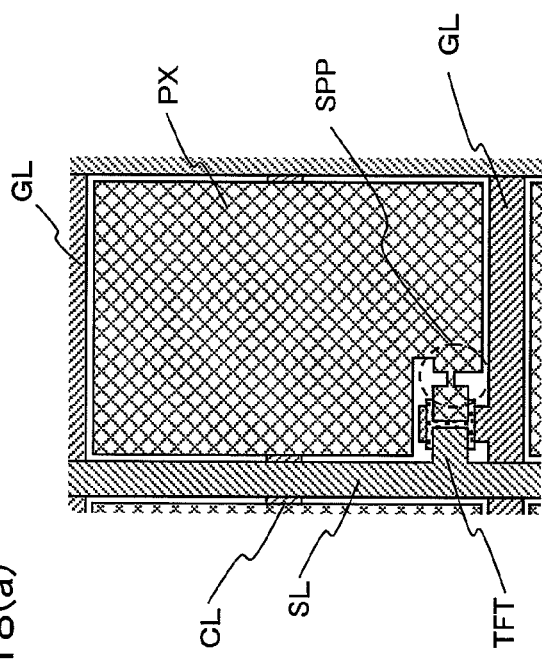
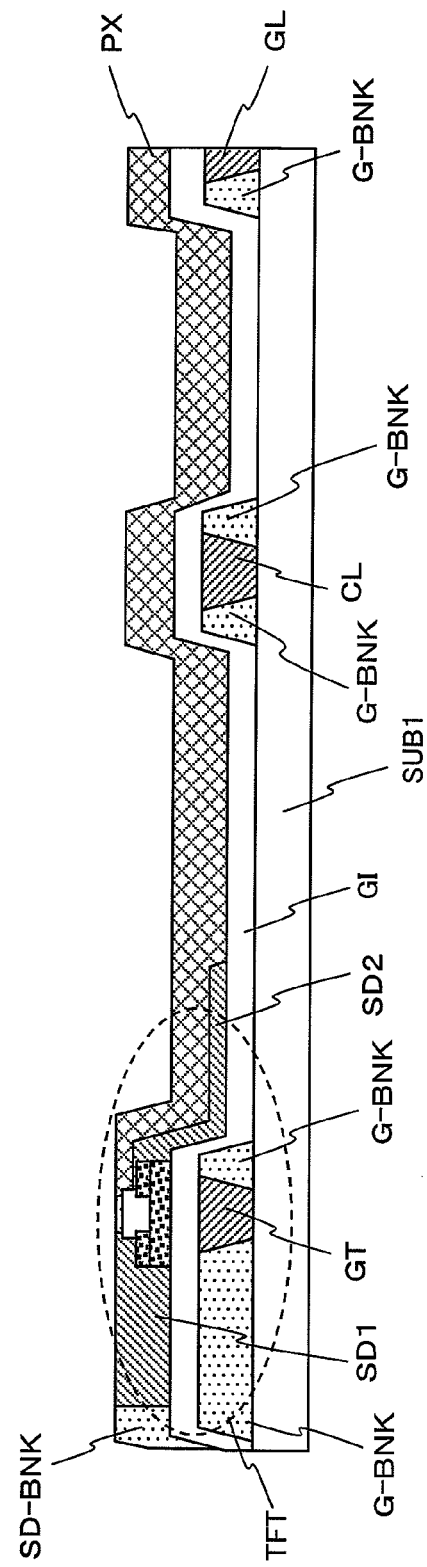
FIG.18(a)
《Structure in plan view》
FIG.18(b)

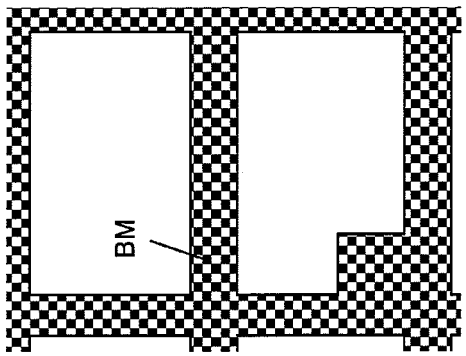
FIG.19(c)
SD-BNK
<<3rd layer; protective film/gate insulator film>>
FIG.19(f)
BM
<<Counter substrate>>
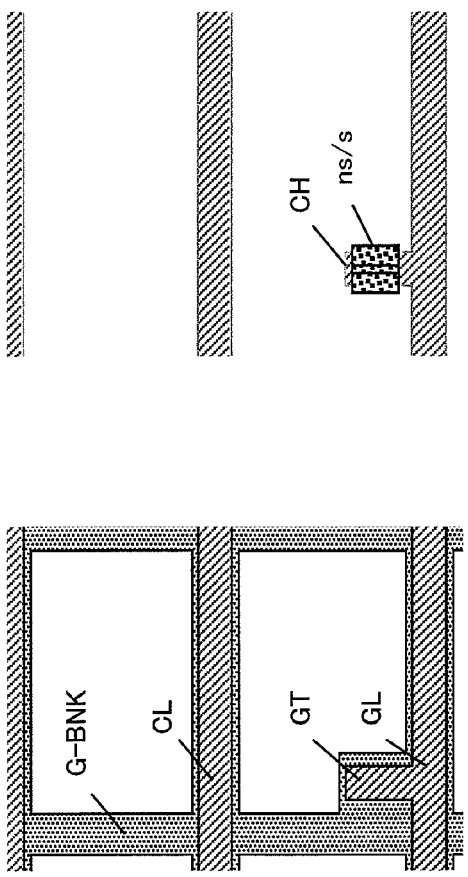
FIG.19(b)
CH
ns/s
<<2nd layer: semiconductor + channel>>
FIG.19(e)
PX    SD
<<7th layer: pixel>>
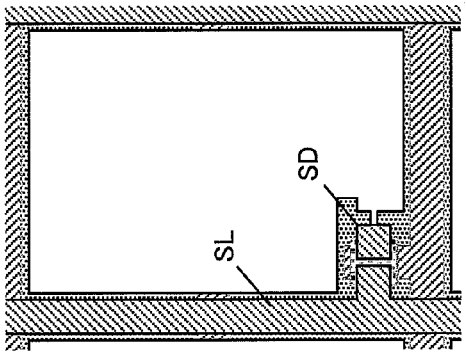
FIG.19(a)
G-BNK
CL
GT
GL
<<1st layer: gate>>
FIG.19(d)
SL
SD
<<4th layer: SD>>

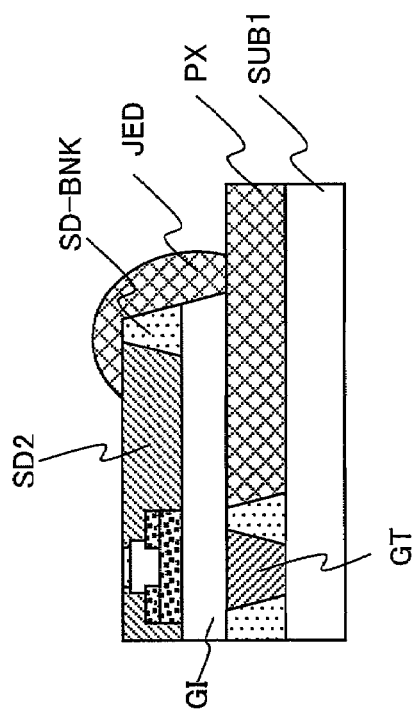
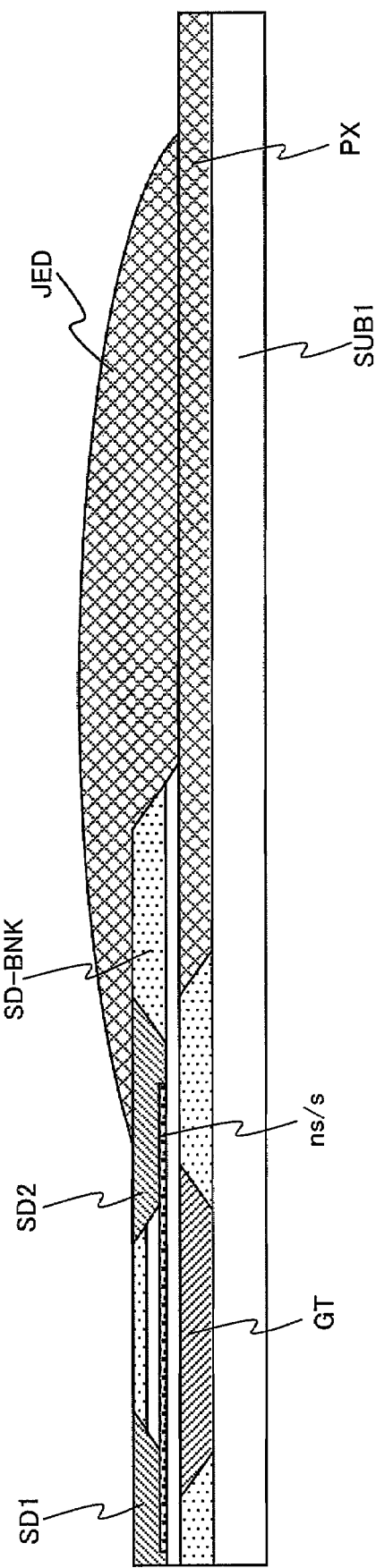
FIG.22(a)
FIG.22(b)

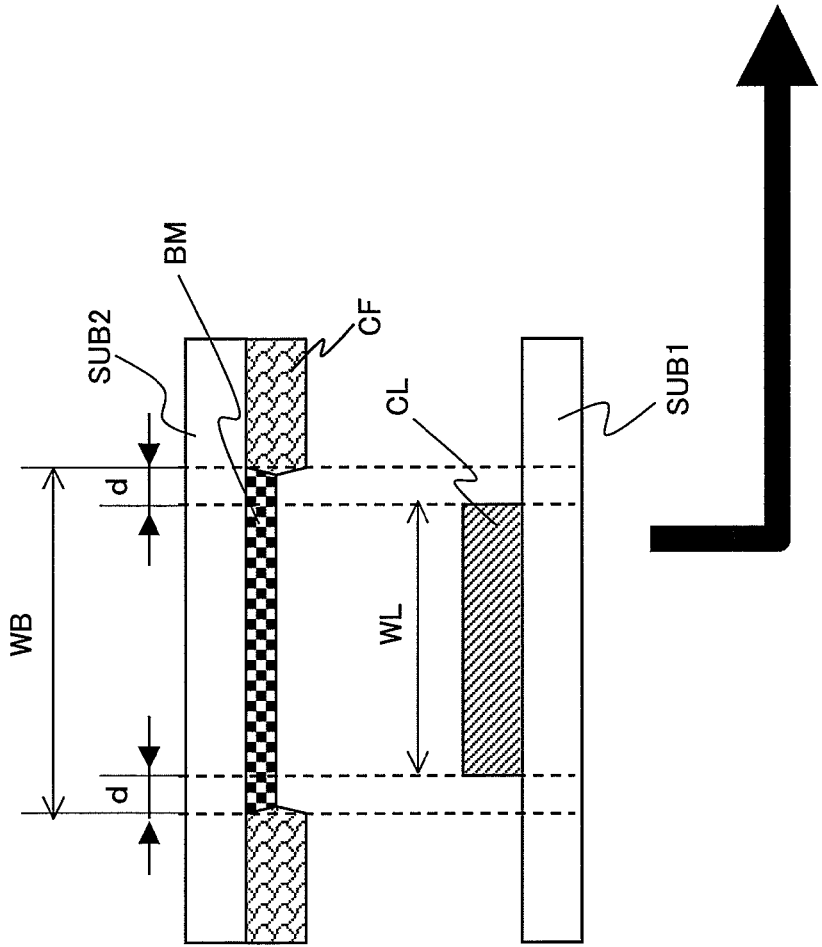
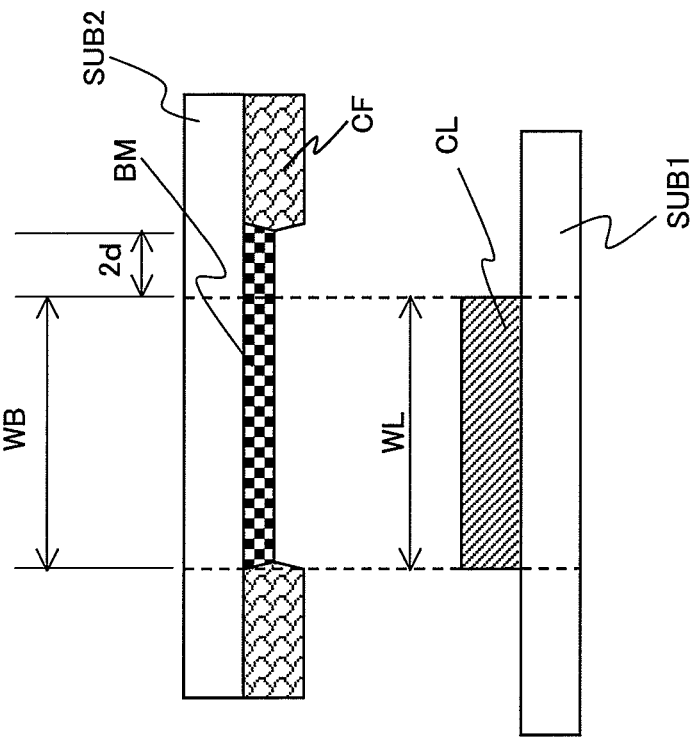
FIG.23(a)
FIG.23(b)

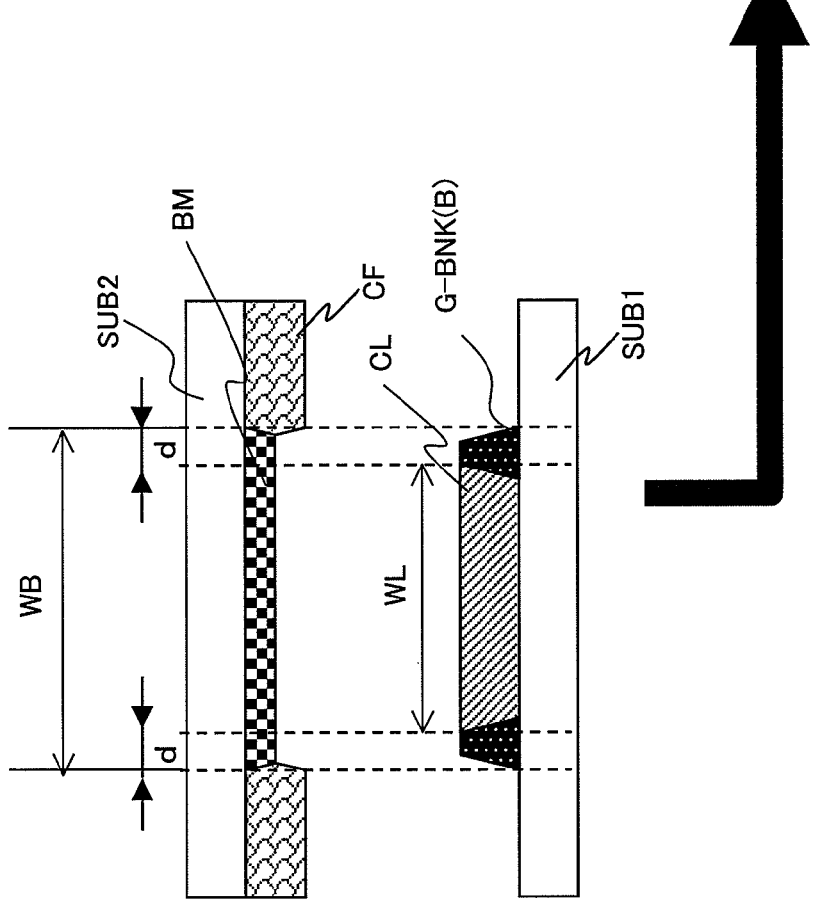
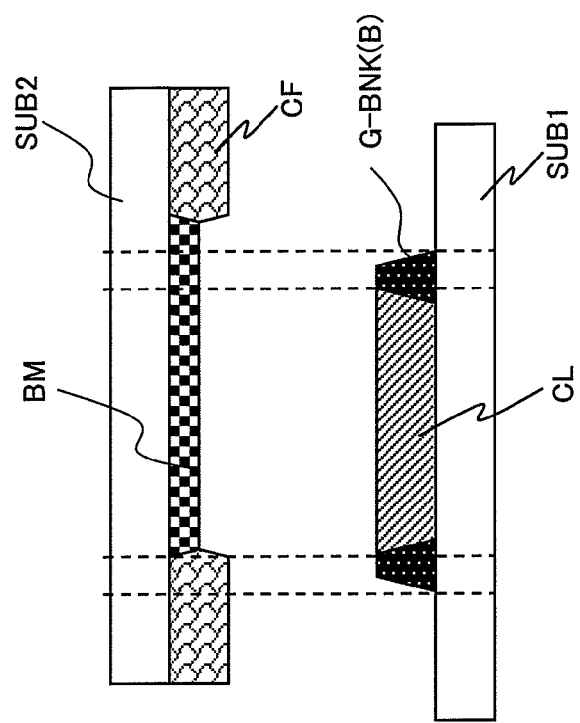
FIG.25(a)
FIG.25(b)

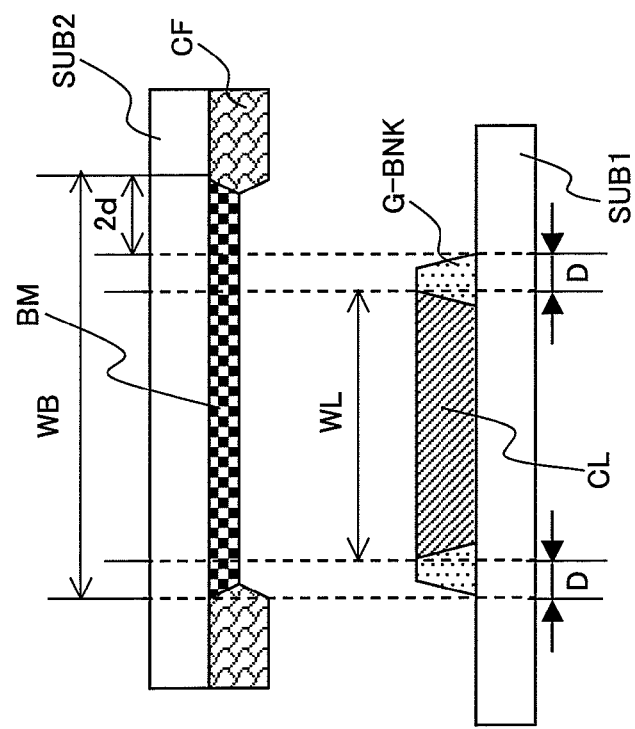
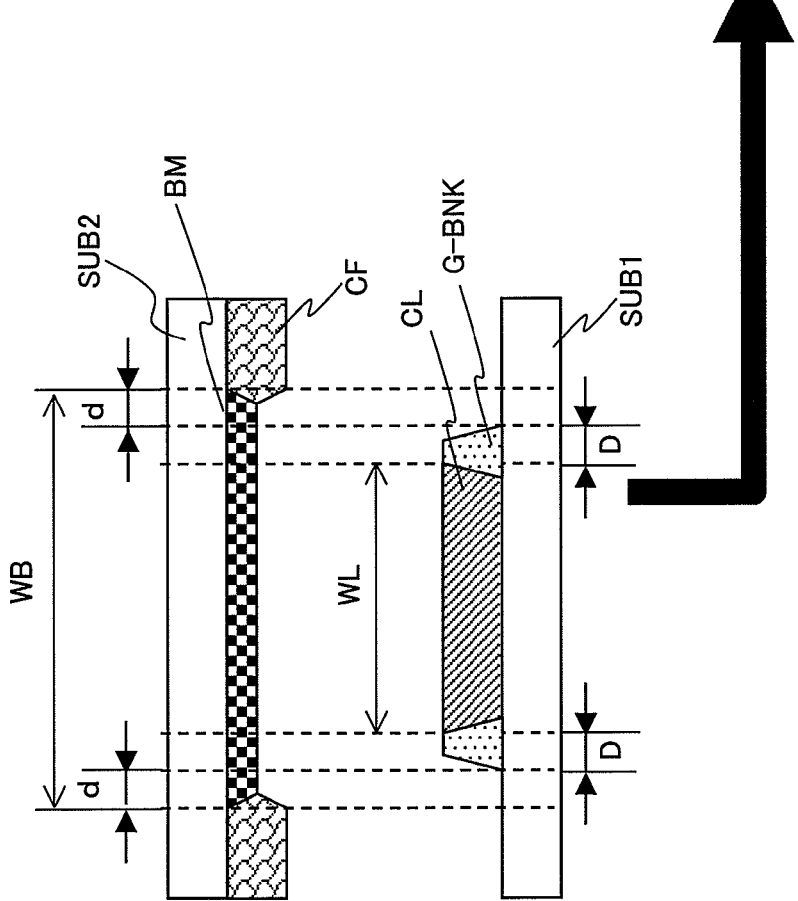
FIG.26(a)
FIG.26(b)

LIQUID CRYSTAL DISPLAY DEVICE

BACKGROUND OF THE INVENTION

1. Field of the Invention

The present invention relates to a liquid crystal display device. In particular, the invention relates to a liquid crystal display device using an active matrix type liquid crystal display panel.

2. Description of the Prior Art

A liquid crystal display device comprises a liquid crystal display panel, a driving circuit, and peripheral devices such as backlight. A liquid crystal display panel of a typical liquid crystal display device of active matrix longitudinal electric field type (the so-called TN type) is prepared by sealing a liquid crystal between a first panel, which is made up by a first substrate (active matrix substrate or thin-film transistor substrate; TFT substrate) and a second panel made up by a second substrate (counter substrate or color filter substrate).

A new technique to provide a high-performance liquid crystal display panel at low cost is proposed in the Patent Document 1, for instance. In this technique, photolithographic process in the manufacture of the liquid crystal display panel is reduced by preparing various types of lines arranged on inner surface of the first substrate, and various types of electrodes and the pixel electrodes or semiconductor layers are prepared by ink jet method. To prepare the lines and the like by ink jet method, an insulating thin film (insulator film) is coated on inner surface of the substrate, and a pattern enclosed by bank-like members (also called "banks") designed to follow the shapes of lines and electrodes is fabricated on the insulator film. In a region enclosed by the banks, a solution (conductive ink) with conductive particles dispersed in a solvent is coated by ink jet method, and then, baking is performed.

FIG. 27 is a schematical drawing to explain an example of a structure formed on inner surface of a first substrate by ink jet method. FIG. 28 is a flow chart to explain a process for forming the lines and the like by using the banks. In FIG. 27 and FIG. 28, photoresist is coated on inner surface of a first substrate SUB1, for which glass is used as a suitable material. The exposure to light is performed via a mask, which has patterns of the gate lines and the gate electrodes, and patterns of the capacity line. Then, these are developed, and the patterns of the gate lines, the gate electrodes and the capacity lines are removed, and the banks (gate banks) G-BNKs are prepared (bank patterning). Processing is performed in such manner that all portions inside the pattern of the gate banks G-BNKs have lyophilic property, and the other portions have liquid repellent property (lyophilic and liquid repellent processing).

A conductive solution (metal ink; e.g. an Ag ink with silver particles dispersed in it) is discharged and coated via ink jet (IJ) nozzle to the gate banks G-BNK. Then, by baking, the gate lines (not shown), the gate electrodes GT, and the capacity lines CT are obtained (by IJ discharge of gate lines/electrodes). Next, there is a process to obtain specific resistance of the line to a predetermined value by additional heating (metal baking (=bank additional heating)). It is desirable that the temperature of the additional heating to obtain specific resistance of the lines to a predetermined value is as high as possible.

On the contrary, the banks for forming the gate lines and the gate electrodes in lower layer of the pixel electrode (gate bank G-BNK) and the banks for forming the source/drain electrodes (source/drain banks SD-BNKs) are colored during additional heating when the lines are baked. To avoid the coloring of the banks, it is desirable to decrease the baking temperature of the lines to a value as low as possible.

[Patent Document 1] JP-A-2005-12181

SUMMARY OF THE INVENTION

For the purpose of obtaining specific resistance of the lines to a predetermined value and of avoiding the coloring of the banks, it has been practiced hitherto to perform 2-step baking, i.e. low temperature baking in the normal atmosphere and high temperature baking in $N_2$. As a result, processing time is longer and this leads to the decrease of the throughput. The coloring of the banks, which are in lower layer of the pixel electrode (display area), means the decrease of transmissivity or color deviation and the deterioration of the display quality. Also, high temperature baking equipment to use at high temperature such as 300° C. is expensive. Further, the use of $N_2$ means the increase of the running cost. Also, the resin material to suppress the coloring caused by the baking to the minimum is limited, and this impedes the reduction of the manufacturing cost.

To solve the problems of the prior art, it is an object of the present invention to provide a liquid crystal display device, by which it is possible to eliminate the decrease of transmissivity and color deviation and to manufacture a liquid crystal display device with high brightness and good display quality produced at low cost.

The liquid crystal display device of the present invention comprises a first substrate with thin-film transistor arranged for each of a plurality of pixels in matrix arrangement, a second substrate where color filters with a plurality of colors formed to match the pixels and a light shielding film and a counter electrode are arranged, and a liquid crystal display panel prepared by attaching said first substrate and said second substrate and by sealing a liquid crystal between said substrates.

The liquid crystal display device of the present invention comprises a gate line where a gate electrode of the thin-film transistor is arranged on the first substrate and used to apply a scan signal, a gate insulator film deposited to cover the gate line, a semiconductor layer formed in island-like shape on the gate insulator film and for making up an active layer of the thin-film transistor, a source electrode and a drain electrode formed on said gate insulator film and individually connected to said semiconductor layer, a data line for forming said source electrode on a part thereof and for supplying the display signal, and a pixel electrode connected to said drain electrode, wherein:

said gate lines and the gate electrodes, said source electrodes and said drain electrodes, and said pixel electrodes are prepared by coating a conductive solution by ink jet method in a region enclosed by the bank-like members of the insulator film and by baking. The bank-like members of the insulator film are arranged only within a region of the light shielding film on the second substrate.

Also, according to the present invention, width of the light shielding film formed on the second substrate and width of the capacity line arranged on the first substrate are determined by taking into consideration on the positioning tolerance on both sides in width direction of the light shielding film and the capacity lines. As a result, the decrease of the contrast caused by the positioning deviation of the first substrate and the second substrate is reduced.

According to the present invention, the number of processes required for the preparation of the liquid crystal display panel can be extensively reduced, and transmissivity is improved. As a result, it is possible to provide a liquid crystal display device with high display quality at low cost.

BRIEF DESCRIPTION OF THE DRAWINGS

FIG. 6 represents plan views of one pixel to sequentially explain a process for manufacturing the first substrate of Embodiment 2 of the invention;

FIG. 9 represents plan views of one pixel to sequentially explain a process for manufacturing the first substrate of Embodiment 3 of the invention;

FIG. 14 represents plan views of one pixel to sequentially explain a process for manufacturing the first substrate of Embodiment 4 of the invention;

FIG. 15 represents drawings to explain one pixel of a first substrate (a thin-film transistor substrate) of a liquid crystal display panel of Embodiment 5 of the liquid crystal display device of the present invention;

FIG. 17 represents plan views of one pixel to sequentially explain a process for manufacturing the first substrate of Embodiment 5 of the invention;

FIG. 18 represents drawings to explain one pixel of a first substrate (a thin-film transistor substrate) of a liquid crystal display panel of Embodiment 6 of the liquid crystal display device of the present invention;

FIG. 19 represents plan views of one pixel to sequentially explain a process for manufacturing the first substrate of Embodiment 6 of the invention;

FIG. 22 represents drawings to explain detailed cross-section of a connection electrode portion shown in each of FIG. 4, FIG. 15, FIG. 16, etc.

FIG. 23 represents drawings to explain a general design example of a light shielding film;

FIG. 25 represents drawings to explain another design example of a capacity line and a light shielding film as shown in FIG. 24;

FIG. 26 represents drawings to explain still another design example of a capacity line and a light shielding film formed on the gate bank of the present invention;

BEST MODE FOR CARRYING OUT THE INVENTION

Detailed description will be given below on the best aspect of the present invention referring to the attached drawings. Bank-like members are walls provided on each side of a groove to make up a groove to hold a conductive solution for preparing lines, electrodes, etc. In the following, description will be given by referring such bank-like members as "banks" (BNKs).

Figure 1A:
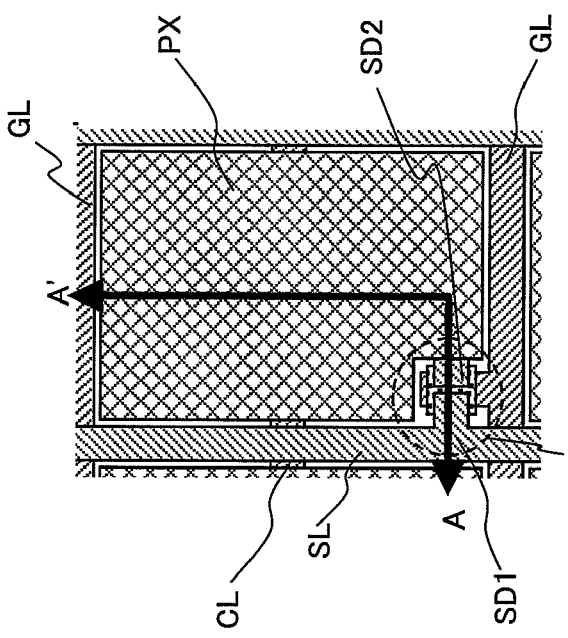
FIG. 1 represents drawings to explain one pixel of a first substrate (a thin-film transistor substrate) of a liquid crystal display panel of Embodiment 1 of a liquid crystal display device of the present invention.
Figure 1B:
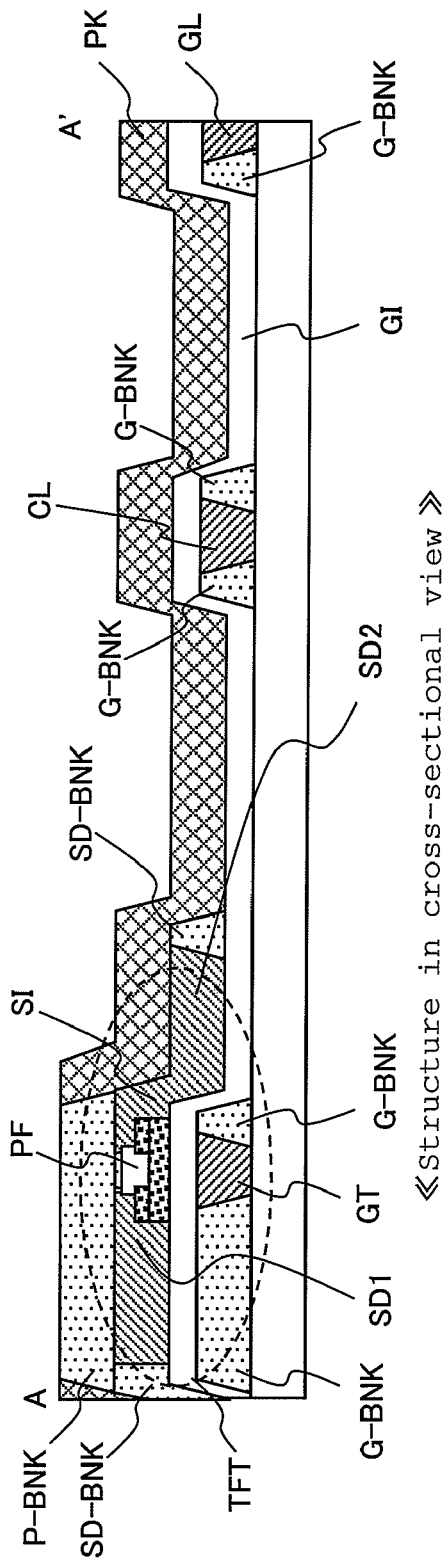

FIG. 1 represents drawings to explain one pixel of a first substrate (a thin-film transistor substrate) of a liquid crystal display panel, which makes up Embodiment 1 of the liquid crystal display device of the present invention. FIG. 1(a) is a plan view, and FIG. 1(b) is a cross-sectional view along the line A-A' in FIG. 1(a). There are provided a plurality of gate lines GL and a plurality of source lines SL to cross the gate lines, and the gate lines and the source lines are formed on a first substrate SUB1, for which glass is used as a suitable material. One pixel is arranged within a region (pixel region) enclosed by two gate lines GL and two source lines SL. The source line SL is also called "data line" because it has a function to supply display data to the thin-film transistor. In the thin-film transistor, source electrode and drain electrode change places with each other during operation, and the term "drain line" may be used. However, description will be given below as the source line SL.

One pixel is made up by a thin-film transistor TFT and a pixel electrode PX. In the present example, a capacity line CL is arranged in a direction parallel to the gate line by traversing the central portion in the display area. The thin-film transistor TFT is disposed near the intersection of the gate line GL and the source line SL. The thin-film transistor TFT comprises a gate electrode GT extending from the data line, a semiconductor film SI, a source electrode SD1, and a drain electrode SD2. In the semiconductor film SI, $n^+$silicon contact layer is laminated on upper layer of silicon, and a channel is formed by removing the central portion of the contact layer. A protective film PF is formed on the channel.

In FIG. 1(b), which is a cross-sectional view along the line A-A' in FIG. 1(a), there are provided a gate bank G-BNK, which is a bank for the gate line GL, the gate electrode GT and the capacity line CL on the first substrate SUB1. The gate banks G-BNKs are arranged in the region of the thin-film transistor TFT and only on the portion where the capacity line CL and the gate line GL are formed. To the drain electrode SD2 of the thin-film transistor TFT, the pixel electrode PX comprising transparent conductive film using ITO as a suitable material is connected.

To prepare the gate electrode GT of the thin-film transistor TFT, a conductive ink using silver (Ag) solution as a suitable material is coated in a groove formed by the gate bank G-BNK provided in the thin-film transistor region by ink jet method. Then, it is baked. The capacity line CL is prepared by the gate bank G-BNK prepared in the pixel region. The gate line GL is prepared by the gate bank G-BNK formed outside of the pixel region. The gate insulator film GI is formed on it. The source electrode SD1 and the drain electrode SD2 are prepared by source-drain bank (hereinafter, may be referred simply as "source bank") SD-BNK provided on the gate insulator film GI. As described later, upper portions of these gate banks G-BNKs are concealed by the light shielding film (black matrix) arranged on the second substrate.

Figure 2:
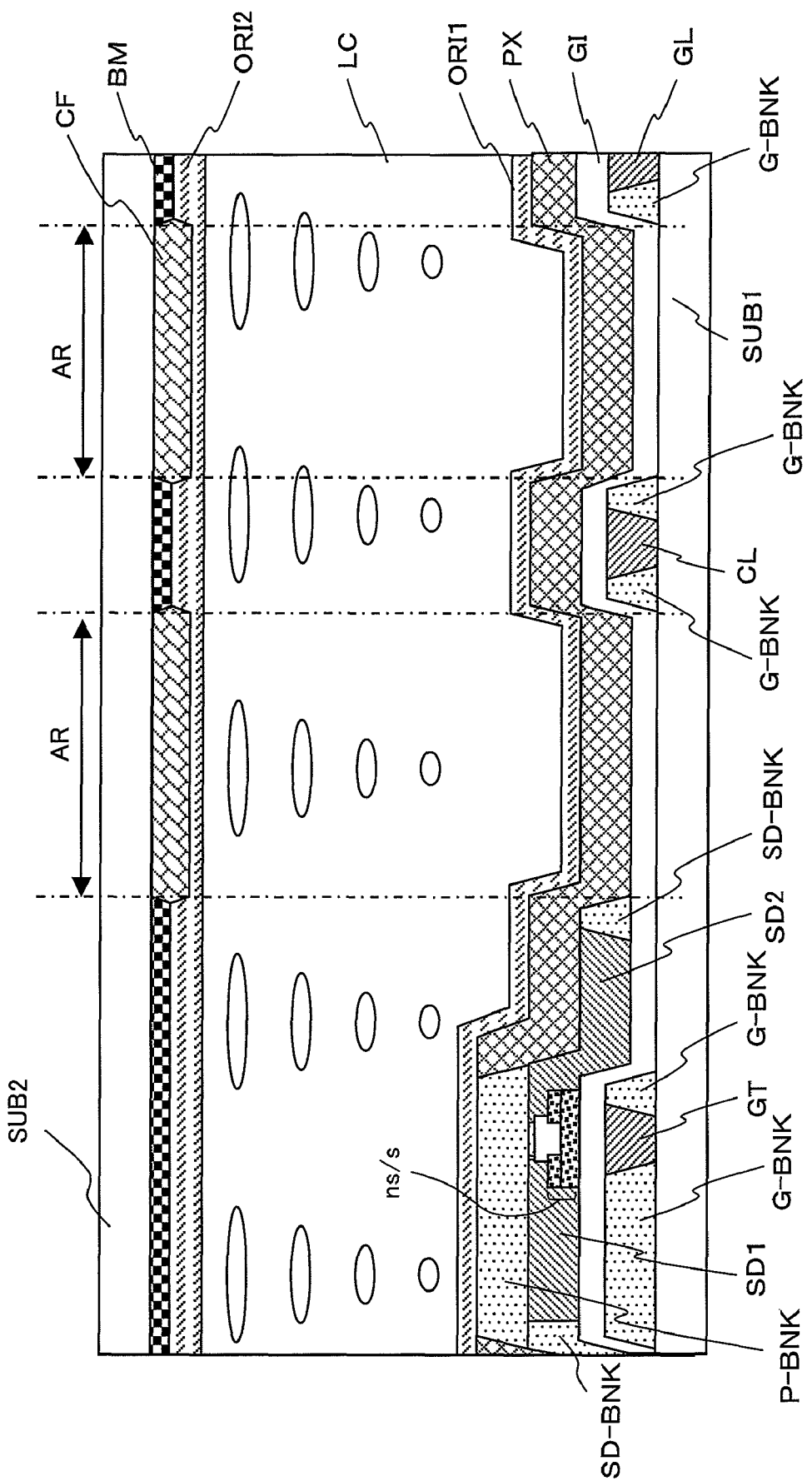
FIG. 2 is a schematical drawing to show cross-section of one pixel of a liquid crystal display panel prepared by attaching a second substrate, i.e. a counter substrate, to the first substrate shown in FIG. 1(b) and by sealing a liquid crystal between the two substrates.

FIG. 2 is a schematical drawing to show a cross-section of one pixel of a liquid crystal display panel prepared by attaching a second substrate, i.e. a counter substrate, to the first substrate shown in FIG. 1(b) and by sealing a liquid crystal between the two substrate. To facilitate the explanation, the counter electrode on the second substrate is not shown in FIG. 2. On the uppermost surface of the first substrate SUB1, a first orientation film ORI1 is formed, and a second orientation film ORI2 is provided on the uppermost surface of the second substrate SUB2. On a lower layer of the second orientation film ORI2, which is formed on the uppermost surface of the second substrate SUB2, a counter electrode (not shown) is arranged by allover deposition. On the lower layer of the counter electrode, a color filter CF and a light shielding film BM are formed. The light shielding film BM is provided at such position that SD bank SD-BNK region (i.e. the region of the thin-film transistor TFT) and the gate line GL are concealed, and at a position to conceal the gate bank G-BNK where the capacity line CL is formed.

In this example, the capacity line CL is arranged within the region where pixel electrode is formed, and pixel display area AR is separated above the capacity line CL and at a portion where the gate bank G-BNK to form the capacity line CL is concealed. Light shutter effect of the liquid crystal LC becomes effective in the display area AR.

FIG. 3 represents plan views of one pixel to sequentially explain a process for manufacturing the first substrate in Embodiment 1 of the present invention. Now, description will be given on this process by referring to FIG. 1 and FIGS. 3(a), (b) . . . in this order. First, inner surface of the first substrate SUB1, for which glass plate is used as a suitable material, is rinsed by initial rinsing. Then, a photosensitive resin film for the gate bank is coated. By the patterning on the gate line, the gate electrode and the capacity line, the gate bank G-BNK is formed. Liquid repellent processing is performed to give liquid repellent property to the surface and outer side of the gate bank G-BNK, and lyophilic processing is carried out to give lyophilic property to inner side of the gate-bank G-BNK.

On inner side (groove) of the gate bank G-BNK, a conductive ink, for which silver solution is used as a suitable material, is coated via ink jet nozzle. After baking, the gate line GL, the gate electrode GT, and the capacity line CT are prepared. Silicon nitride SiN is deposited by vacuum evaporation over inner surface of the first substrate SUB1, including the gate banks G-BNKs on both sides, the gate line GL, the gate electrode GT, and the capacity line CT on both sides of these, and the gate insulator film GI is formed. On the gate insulator film GI, amorphous silicon semiconductor film (a-Si)S and $n^+$silicon semiconductor film ($n^+$Si) nS are deposited by vacuum evaporation sequentially. The amorphous silicon semiconductor film S and $n^+$silicon semiconductor film nS are formed in island-like shape by photolithographic process. Compared with the semiconductor film S, the $n^+$silicon semiconductor film nS is extremely thin, and this is to be a contact layer for the source/drain electrode as described later.

The $n^+$silicon semiconductor film nS is separated to the source electrode side and the drain electrode side. A channel is formed between the separated portions. To cover the amorphous silicon semiconductor film exposed to the channel portion, the protective film PF is buried. On the gate insulator film GI, a source/drain bank SD-BNK is formed. The source/drain bank SD-BNK is prepared in a manner similar to the preparation of the gate bank G-BNK. Also, the source/drain bank SD-BNK is formed at a position where it is concealed by the light shielding film on inner surface of the second substrate disposed above the thin-film transistor TFT. A conductive ink is coated by ink jet method on the source/drain bank SD/BNK. By baking this, the source electrode SD1 and the drain electrode SD2 are prepared. The drain electrode SD2 has a structure with a graded step similar to the lower layer structure.

Figure 3A:
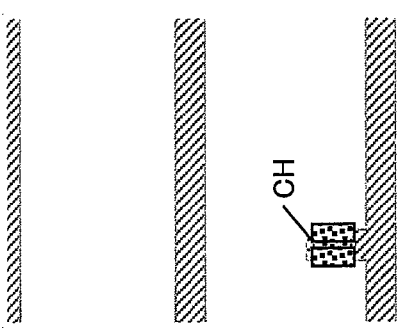
FIG. 3 represents plan views of one pixel to sequentially explain a process for manufacturing the first substrate of Embodiment 1 according to the present invention.
Figure 3B:
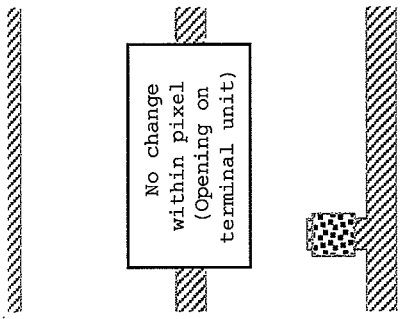
Figure 3C:
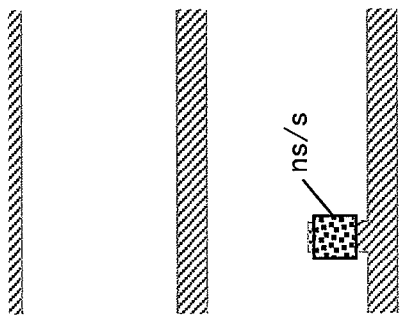
Figure 3E:
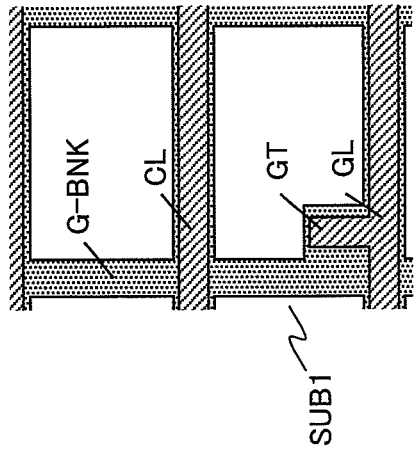
Figure 3D:
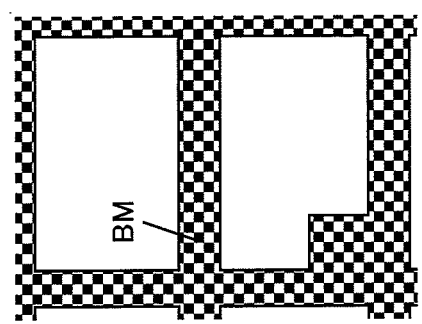
Figure 3F:
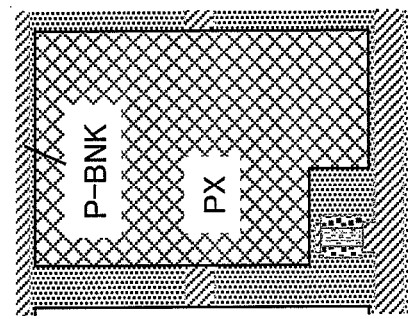
Figure 3G:
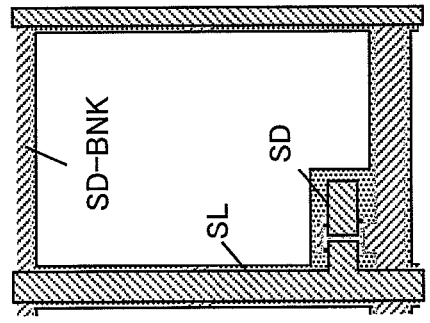
Figure 3H:
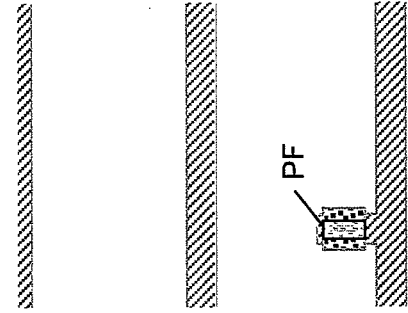

Next, a pixel bank P-BNK is formed to enclose the pixel region on the source line SL including the upper layer of the thin-film transistor TFT and on the gate line GL between adjacent pixels. Upper surface of this pixel bank P-BNK is processed by liquid repellent processing, and the surfaces of the drain electrode SD2 including wall surface on both sides and the surface of the gate insulator film GI are processed by lyophilic processing. Between the pixel banks P-BNK, a solution containing conductive particles, for which ITO is used as a suitable material, is coated by ink jet method. After baking, this is prepared as the pixel electrode PX. FIG. 3(h) shows a pattern of light shielding film (black matrix) formed on inner surface of the second substrate SUB2.

According to Embodiment 1, the pixel region AR does not have a bank layer in the lower layer. Thus, even when coloring of bank occurs due to the baking to maintain specific resistance of the lines to a predetermined value, no influence is exerted on light transmissivity of the pixel region AR, and a liquid crystal display device with high brightness and good color reproducibility can be obtained.

Embodiment 2

Figure 4A:
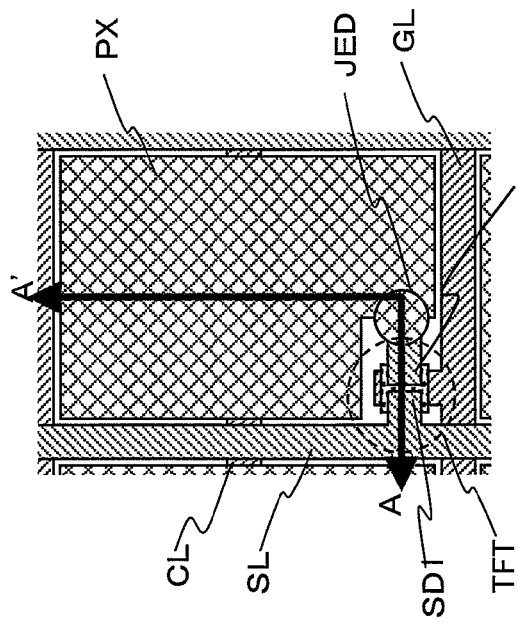
FIG. 4 represents drawings to explain one pixel of a first substrate (a thin-film transistor substrate) of a liquid crystal display panel of Embodiment 2 of the liquid crystal display device of the present invention.
Figure 4B:
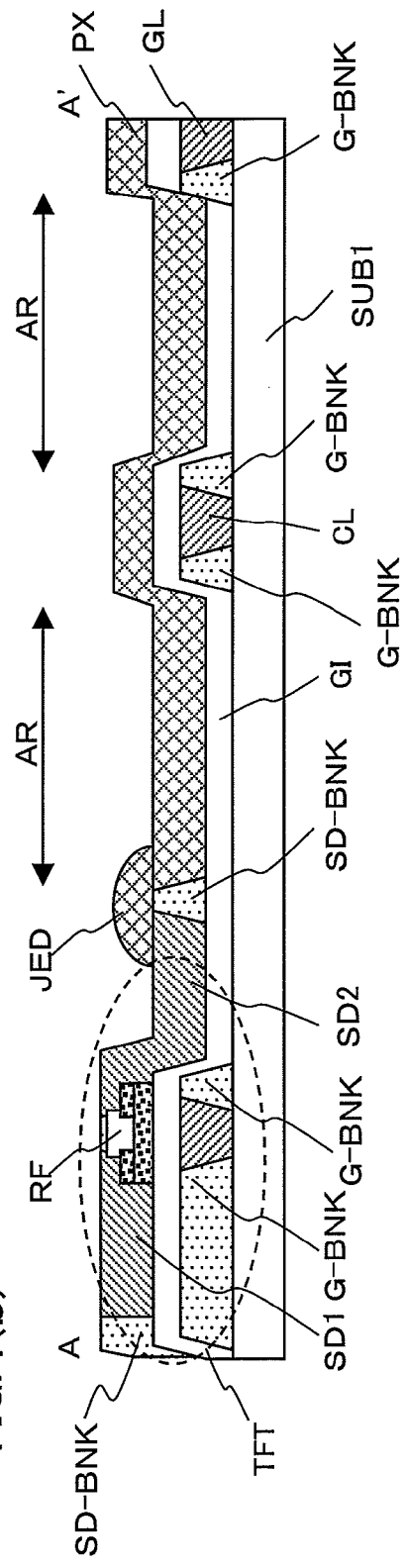
Figure 5:
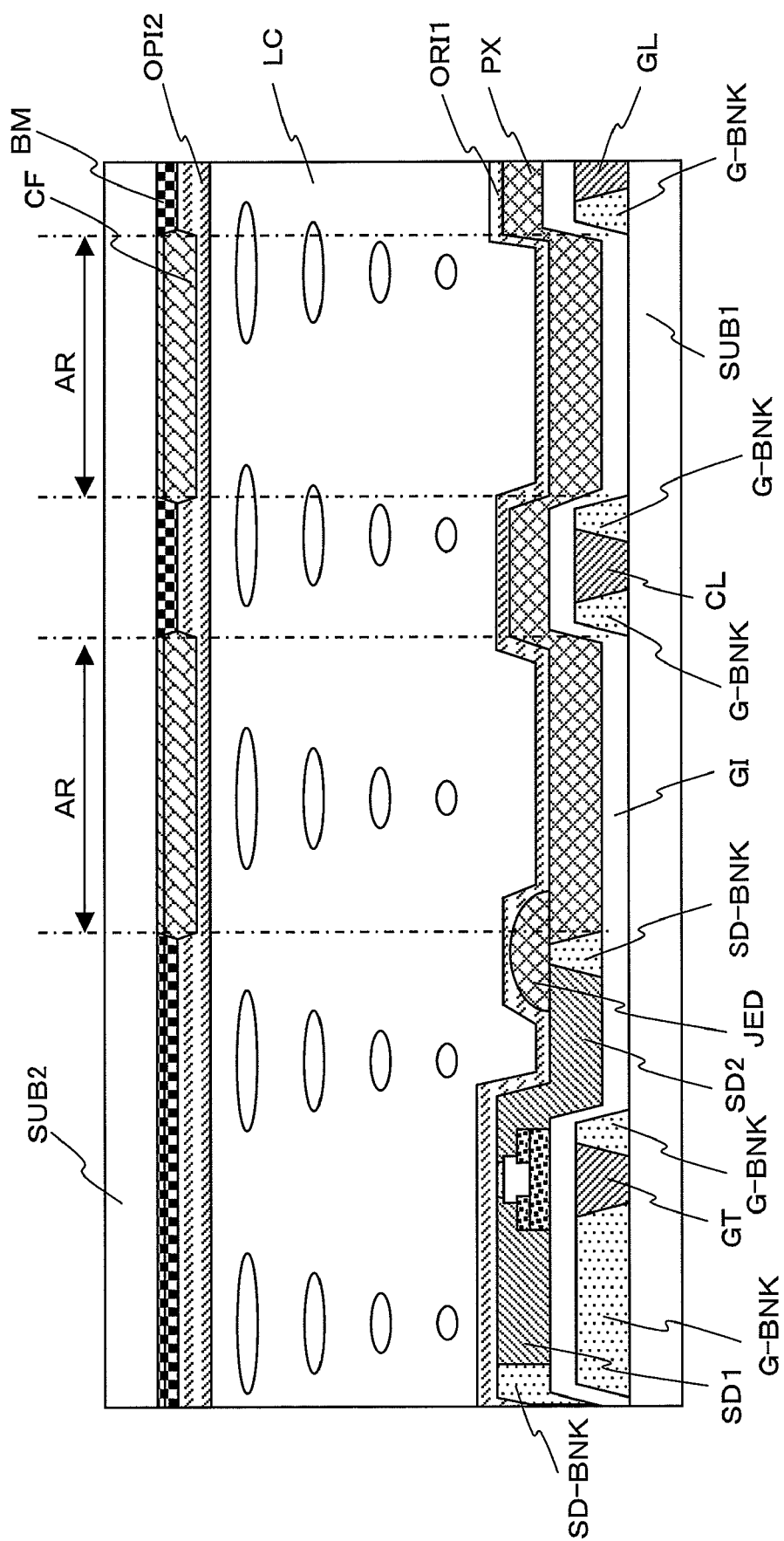
FIG. 5 is a schematical drawing to show cross-section of one pixel of a liquid crystal display panel prepared by attaching a second substrate, i.e. a counter substrate, to the first substrate shown in FIG. 4(b) and by sealing a liquid crystal between the two substrates.

FIG. 4 represents drawings to explain one pixel of a first substrate (a thin-film transistor substrate) of a liquid crystal display panel of Embodiment 2 of the present invention. FIG. 4(a) is a plan view, and FIG. 4(b) is a cross-sectional view along the line A-A' in FIG. 4(a). FIG. 5 is a schematical drawing to show cross-section of one pixel of the liquid crystal display panel prepared by attaching a second substrate, i.e. a counter substrate, to the first substrate shown in FIG. 4(b) and by sealing a liquid crystal between the two substrates. To facilitate the explanation, a counter electrode on the second substrate is not shown in FIG. 5. FIG. 6 represents plan views to sequentially explain a process for manufacturing the first substrate in Embodiment 2.

In FIG. 4, there are provided a plurality of gate lines GL formed on the first substrate SUB1, for which glass is used as a suitable material, and a plurality of source lines SL crossing the gate lines, and one pixel is provided in a region (pixel region) enclosed by two gate lines GL and two source lines SL. In the thin-film transistor, the source electrode and the drain electrode change places with each other during operation, and this may be called "drain line". However, description will be given here as the source line SL. One pixel is made up by the thin-film transistor TFT and the pixel electrode PX.

In this Embodiment, too, a capacity line CL is arranged in a direction parallel to the gate line by traversing approximately the central portion in the region where the source electrode is formed. The thin-film transistor TFT is arranged near the intersection of the gate line GL and the source line SL. The thin-film transistor TFT comprises a gate electrode GT extending from the gate line, a semiconductor film SI, a source electrode SD1, and a drain electrode SD2. To prepare the semiconductor film SI, a contact layer of n+silicon is laminated on upper layer of silicon, and a channel is formed by removing the central portion of this contact layer. A protective film PF is filled in the channel.

In FIG. 4(b), there are provided the gate line GL, the gate electrode GT, and the gate bank G-BNK, which is a bank to form the capacity line CL, on the first substrate SUB1. The gate-banks G-BNKs are arranged only within the region of the thin-film transistor TFT—in the portion where the capacity line CL is formed, and on the portion where the gate line GL is formed. On the drain electrode SD2 of the thin-film transistor TFT, a pixel electrode PX made of a transparent conductive film, for which ITO is used as a suitable material, is connected via a connection electrode JED.

To prepare the gate electrode GT of the thin-film transistor TFT, a conductive ink, for which silver (Ag) solution is used as a suitable material, is coated by ink jet method in a groove prepared by the gate bank G-BNK in the region where the thin-film transistor is formed. After baking the gate electrode GT is formed. The capacity line CL is formed by the gate bank G-BNK arranged in the pixel region. The gate line GL is prepared by the gate bank G-BNK outside of the pixel region. The gate insulator film GI is prepared on it. The source electrode SD1 and the drain electrode SD2 are formed by SD bank SD-BNK provided on the gate insulator film GI. As described later, the portion of the gate-banks G-BNKs are at such positions that these are concealed by the light shielding film (black matrix) on the second substrate.

FIG. 5 is a schematical drawing to show a cross-section of one pixel of the liquid crystal display panel prepared by attaching a second substrate, i.e. a counter substrate, to the first substrate shown in FIG. 4(b) and by sealing a liquid crystal between the two substrates. Here, too, similarly to the cases shown in FIG. 1, to facilitate the explanation, the counter electrode on the second substrate is not shown in FIG. 5. A first orientation film ORI1 is formed on the uppermost surface of the first substrate SUB1, and a second orientation film ORI2 is prepared on the uppermost surface of the second substrate SUB2. On the lower layer of the second orientation film ORI2 prepared on the uppermost surface of the second substrate SUB2, a counter electrode (not shown) is formed by allover deposition. On the lower layer of this counter electrode, a color filter CF and a light shielding film BM are arranged. The light shielding film BM is provided at a position to conceal SD bank SD-BNK, which is to be the region of the thin-film transistor TFT, and the gate line GL, and also at a position to conceal the gate bank G-BNK where the capacity line CL is formed.

In this Embodiment, too, the capacity line CL is arranged in the region of the pixel electrode. A display area AR of pixel is separated at a portion to conceal the gate bank G-BNK where the capacity line CL is formed on upper layer of the capacity line CL. Light shutter effect of the liquid crystal LC becomes effective in the display area AR. In this Embodiment, the bank to form the pixel electrode PX is not provided, and the pixel electrode PX is formed by using the SD bank SD-BNK. Thus, a process to prepare the bank for pixel electrode is not needed. The connection electrode JED to connect the pixel electrode PX to the drain electrode SD2 is coated by dropping an ink using ink jet method.

FIG. 6 represents plan views of one pixel to sequentially explain a process for manufacturing the first substrate of Embodiment 2 of the present invention. Now, description will be given on this process by sequentially referring to FIG. 5 and FIGS. 6(a), (b) . . . in this order. First, initial rinsing is performed on inner surface of the first substrate SUB1, for which glass plate is used as a suitable material. Then, a photosensitive resin film for the gate bank is coated. By carrying out the patterning to form the gate line, the gate electrode and the capacity line, the gate bank G-BNK is prepared. Liquid repellent processing is performed on the surface and on outer side of the gate bank G-BNK, and lyophilic processing is performed on inner side of the gate bank G-BNK.

On inner side (groove) of the gate bank G-BNK, a conductive ink, for which silver solution is used as a suitable material, is coated via ink jet nozzle. After baking, the gate line GL, the gate electrode GT, and the capacity line CL are prepared. Silicon nitride SiN is deposited by vacuum evaporation on inner surface of the first substrate SUB1 including the gate line GL, the gate electrode GL, the capacity line CT, and the gate banks G-BNKs on both sides of these, and the gate insulator film GI is formed. On the gate insulator film GI, amorphous silicon semiconductor film (a-Si)S, and n+silicon semiconductor film (n+Si) nS are deposited one after another by vacuum evaporation. The amorphous silicon semiconductor film S and the n+silicon semiconductor film nS are formed in island-like shape by photolithographic process. The n+silicon semiconductor film nS is extremely thin compared with the amorphous silicon semiconductor film S, and it is turned to a contact layer for the source/drain electrode.

The n+silicon semiconductor film nS is separated to the source electrode side and to the drain electrode side. A channel is formed between the separated portions. The protective film PF is buried to cover the amorphous silicon semiconductor film S exposed to the channel. On the gate insulator layer, a source/drain bank SD-BNK is arranged. This source/drain bank SD-BNK is prepared in a manner similar to the gate bank G-BNK. Also, the source/drain bank SD-BNK is formed at a position where it is concealed by a light shielding film on inner surface of the second substrate arranged above the thin-film transistor TFT. A conductive ink is coated on the source/drain bank SD-BNK by ink jet method. After baking, the source electrode SD1 and the drain electrode SD2 are prepared. The drain electrode SD2 has a graded step to follow the lower structure.

Next, using the source/drain bank SD-BNK on the drain electrode SD2 side and the bank G-BNK for the gate line, a solution of transparent conductive particles, for which ITO is used as a suitable material, is coated on the display area by ink jet method. After baking, a pixel electrode PX is formed. The same conductive ink as used on the pixel electrode PX is dropped and coated between the pixel electrode PX and the drain electrode SD2. After baking, a connection electrode JED is prepared. FIG. 6 (h) shows a pattern of the light shielding film (black matrix) BM to be formed on inner surface of the second substrate SUB2.

According to Embodiment 2, in addition to the effects described in Embodiment 1, there is no need to have the bank for forming the pixel electrode PX. As a result, it is possible to obtain a liquid crystal display device with high brightness and with good color reproducibility.

Embodiment 3

Figure 7A:
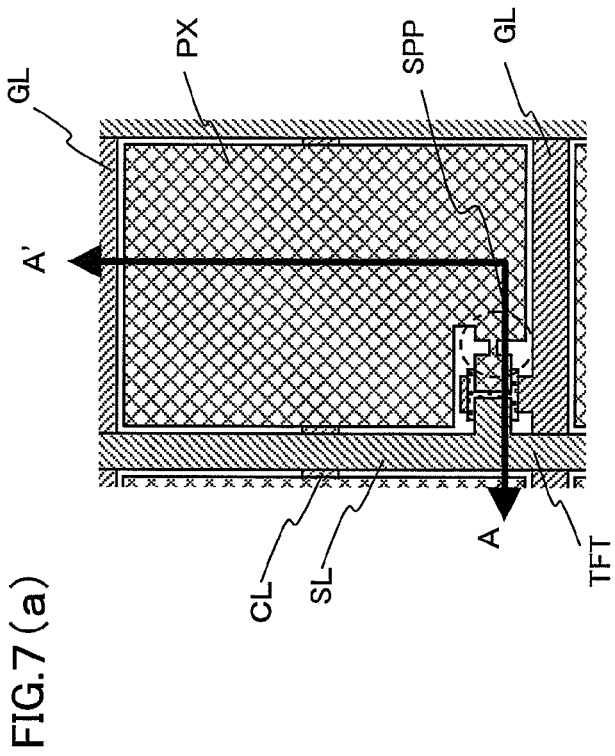
FIG. 7 represents drawings to explain one pixel of a first substrate (a thin-film transistor substrate) of a liquid crystal display panel of Embodiment 3 of the liquid crystal display device according to the present invention.
Figure 7B:
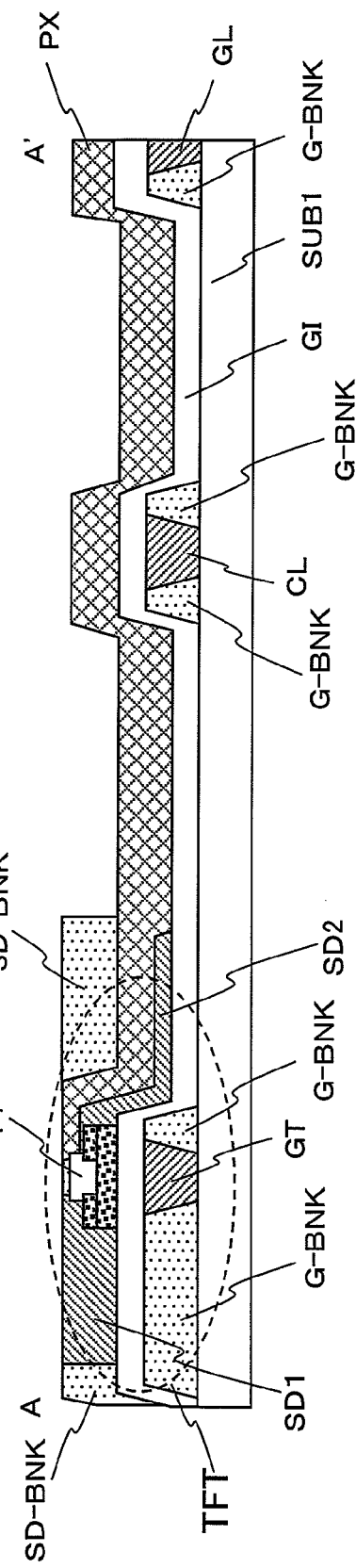
Figure 8:
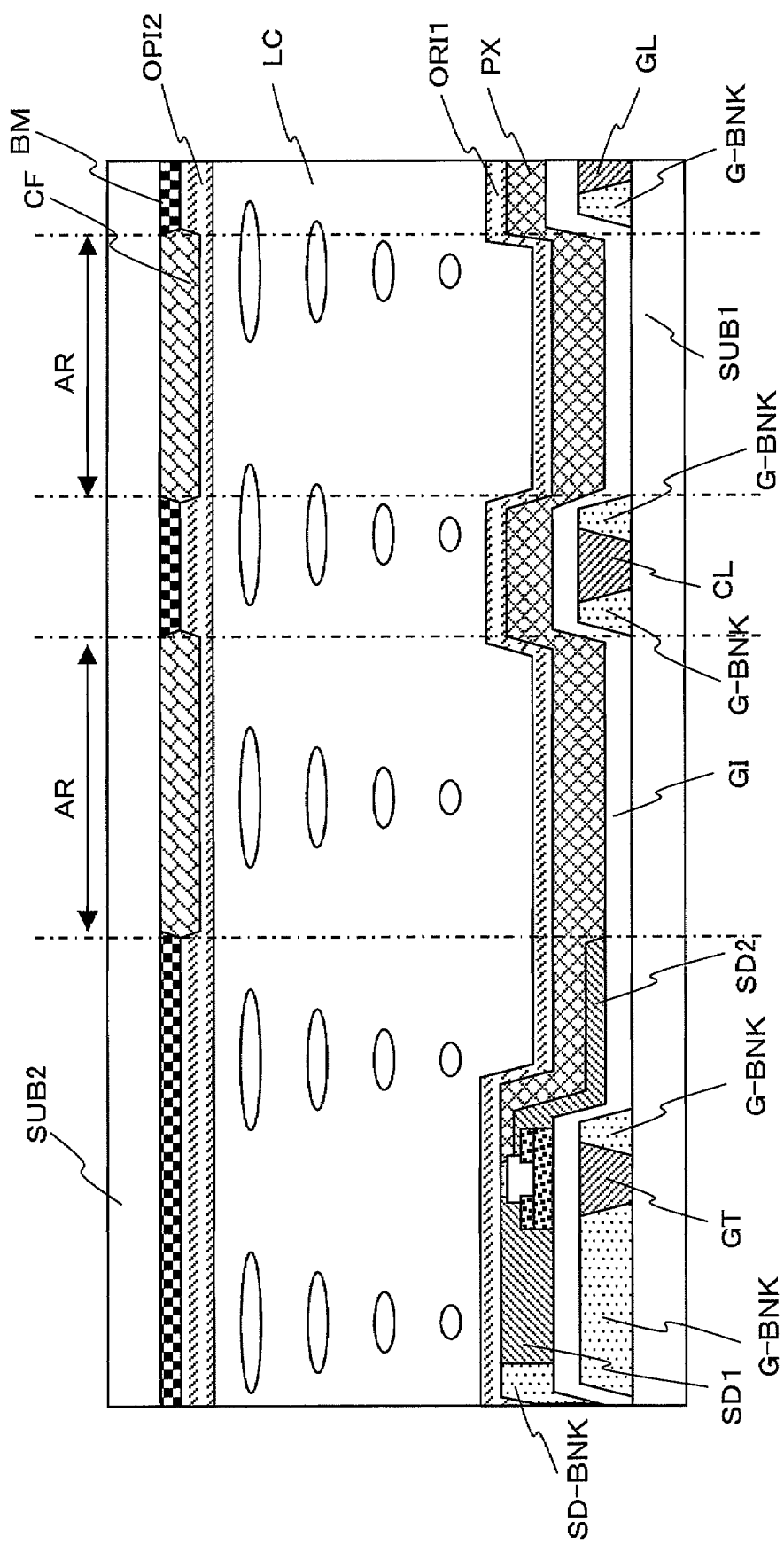
FIG. 8 is a schematical drawing to show cross-section of one pixel of a liquid crystal display panel prepared by attaching a second substrate, i.e. a counter substrate, to the first substrate shown in FIG. 7(b) and by sealing a liquid crystal between the two substrates.

FIG. 7 represents drawings to explain one pixel of a first substrate (a thin-film transistor substrate) of a liquid crystal display panel of Embodiment 3 for the liquid crystal display device of the present invention. FIG. 7(a) is a plan view, and FIG. 7(b) is a cross-sectional view along the line A-A' in FIG. 7(a). FIG. 8 is a schematical view showing a cross-section of one pixel of the liquid crystal display panel prepared by attaching a second substrate, i.e. a counter electrode, to the first substrate shown in FIG. 7(b) and by sealing a liquid crystal between the two substrates. To facilitate the explanation, the counter electrode on the second substrate is not shown in FIG. 8. FIG. 9 represents plan views of one pixel for sequentially explaining a process for manufacturing the first substrate of Embodiment 3.

In FIG. 7, there are provided a plurality of gate lines formed on the first substrate SUB1, for which glass is used as a suitable material, and a plurality of source lines SL to cross the gate lines. One pixel is formed in a region (pixel region) enclosed by two gate lines and two source lines. Regarding the source electrode and the drain electrode, description will be given here as the source line SL. One pixel is made up by the thin-film transistor TFT and the pixel electrode PX.

In this Embodiment, too, a capacity line CL is arranged in a direction parallel to the gate by traversing approximately the central portion in the region where the source electrode is formed. The thin-film transistor TFT is arranged near the intersection of the gate line GL and the source line SL. The thin-film transistor TFT comprises a gate electrode GT extending from the gate line, a semiconductor film SI, a source electrode SD1, and a drain electrode SD2. To prepare the semiconductor film SI, a contact layer of $n^+$silicon is laminated on upper layer of silicon, and a channel is formed by removing the central portion of this contact layer. A protective film PF is filled in the channel.

In FIG. 7(b), there are provided the gate line GL, the gate electrode GT, and the gate bank G-BNK, which is a bank to form the capacity line CL, on the first substrate SUB1. The gate-banks G-BNKs are arranged only within the region of the thin-film transistor TFT, in the portion where the capacity line CL is formed, and on the portion where the gate line GL is formed. On the drain electrode SD2 of the thin-film transistor TFT, a pixel electrode PX made of a transparent conductive film, for which ITO is used as a suitable material, is connected via a separation pattern SPP.

To prepare the gate electrode GT of the thin-film transistor TFT, a conductive ink, for which silver (Ag) solution is used as a suitable material, is coated by ink jet method in a groove prepared by the gate bank G-BNK in the region where the thin-film transistor is formed. The capacity line CL is formed by the gate bank G-BNK arranged in the pixel region. The gate line GL is prepared by the gate bank G-BNK outside of the pixel region. The gate insulator film GI is prepared on it. The source electrode SD1 and the drain electrode SD2 are formed by SD bank SD-BNK provided on the gate insulator film GI. As described later, upper portions of the gate-banks G-BNKs are at such positions that these are concealed by the light shielding film (black matrix) on the second substrate.

FIG. 8 is a schematical drawing to show a cross-section of one pixel of the liquid crystal display panel prepared by attaching a second substrate, i.e. a counter substrate, to the first substrate shown in FIG. 7(b) and by sealing a liquid crystal between the two substrates. Here, too, similarly to the cases shown in FIG. 1 and FIG. 4, to facilitate the explanation, the counter electrode on the second substrate is not shown in FIG. 8. A first orientation film ORI1 is formed on the uppermost surface of the first substrate SUB1, and a second orientation film ORI2 is prepared on the uppermost surface of the second substrate SUB2. On the lower layer of the second orientation film ORI2 prepared on the uppermost surface of the second substrate SUB2, a counter electrode (not shown) is formed by allover deposition. On the lower layer of this counter electrode, a color filter CF and a light shielding film BM are arranged. The light shielding film BM is provided at a position to conceal SD bank SD-BNK, which is to be the region of the thin-film transistor TFT, and the gate line GL, and also at a position to conceal the gate bank G-BNK where the capacity line CL is formed.

In this Embodiment, too, the capacity line CL is arranged in the region of the pixel electrode. A display area AR of pixel is separated at a portion to conceal the gate bank G-BNK where the capacity line CL is formed on upper layer of the capacity line CL. Light shutter effect of the liquid crystal LC becomes effective in the display area AR. In this Embodiment, the bank to form the pixel electrode PX is not provided, and the pixel electrode PX is formed by using SD bank SD-BNK. Thus, a process to prepare the bank for pixel electrode is not needed. The pixel electrode PX is connected to the drain electrode SD via a separation pattern SPP. The separation pattern SPP will be described in connection with FIG. 10.

FIG. 9 represents plan views of one pixel to sequentially explain a process for manufacturing the first substrate of Embodiment 3 of the present invention. Now, description will be given on this process by sequentially referring to FIG. 8 and FIG. 9(a), (b) . . . in this order. First, initial rinsing is performed on inner surface of the first substrate SUB1, for which glass plate is used as a suitable material. Then, a photosensitive resin film for the gate bank is coated. By carrying out the patterning to form the gate line, the gate electrode and the capacity line, the gate bank G-BNK is prepared. Liquid repellent processing is performed on the surface and on outer side of the gate bank G-BNK, and lyophilic processing is performed on inner side of the gate bank G-BNK.

On inner side (groove) of the gate bank G-BNK, a conductive ink, for which silver solution is used as a suitable material, is coated via ink jet nozzle. After baking, the gate line GL, the gate electrode GT, and the capacity line CL are prepared. Silicon nitride SiN is deposited by vacuum evaporation on inner surface of the first substrate SUB1 including the gate line GL, the gate electrode GL, the capacity line CT, and the gate banks G-BNKs on both sides of these, and the gate insulator film GI is formed. On the gate insulator film GI, amorphous silicon semiconductor film (a-Si)S, and $n^+$silicon semiconductor film ($n^+$Si) nS are deposited one after another by vacuum evaporation. The amorphous silicon semiconductor film S and the $n^+$silicon semiconductor film nS are formed in island-like shape by photolithographic process. The $n^+$silicon semiconductor film nS is extremely thin compared with the amorphous silicon semiconductor film S, and it is turned to a contact layer for the source/drain electrode.

The n+silicon semiconductor film nS is separated to the source electrode side and to the drain electrode side. A channel is formed between the separated portions. The protective film PF is buried to cover the amorphous silicon semiconductor film S exposed to the channel. On the gate insulator layer, a source/drain bank SD-BNK is arranged. The source/drain bank has the groove pattern for forming the separation pattern SPP in the side of the pixel electrode. This source/drain bank SD-BNK is prepared in a manner similar to the gate bank G-BNK. Also, the source/drain bank SD-BNK is formed at a position where it is concealed by a light shielding film on inner surface of the second substrate arranged above the thin-film transistor TFT.

A conductive ink is coated on the source/drain bank SD-BNK by ink jet method. After baking, the source electrode SD1 and the drain electrode SD2 are prepared. The drain electrode SD2 has a graded step to follow the lower structure. But, the coating amount of the conductive ink is limited on the drain electrode SD2. It is so arranged that the amount of the ink to become the film when it is baked by overlapping with the conductive ink for the pixel electrode coated subsequently will be equal to the thickness of the source electrode SD1.

Next, using the source/drain bank SD-BNK on the drain electrode SD2 side and the bank G-BNK for the gate line, a solution of transparent conductive particles, for which ITO is used as a suitable material, is coated on the display area by ink jet method. After baking, a pixel electrode PX is formed. In this case, the conductive ink solution for the pixel electrode PX flows to upper layer of the drain electrode SD2 in the groove pattern for forming the separation pattern SPP, and it is connected to the drain electrode SD2 in 2-layer structure or in a mixed structure. FIG. 9(h) shows the pattern of the light shielding film (black matrix) BM to be formed on inner surface of the second substrate SUB2.

Figure 10A:
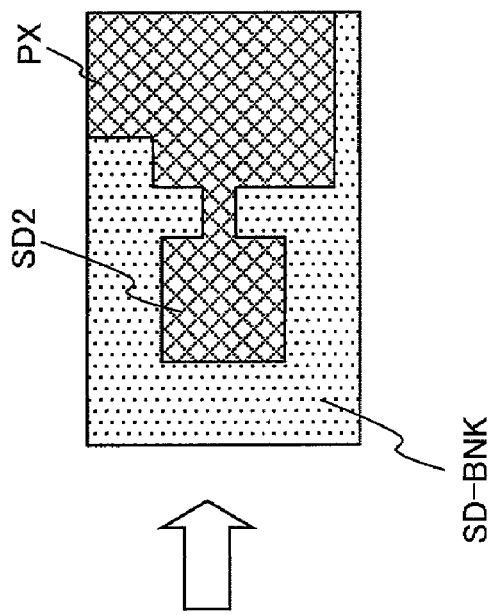
FIG. 10 represents drawings to explain preparation of a separate pattern in Embodiment 3 of the present invention.
Figure 10B:
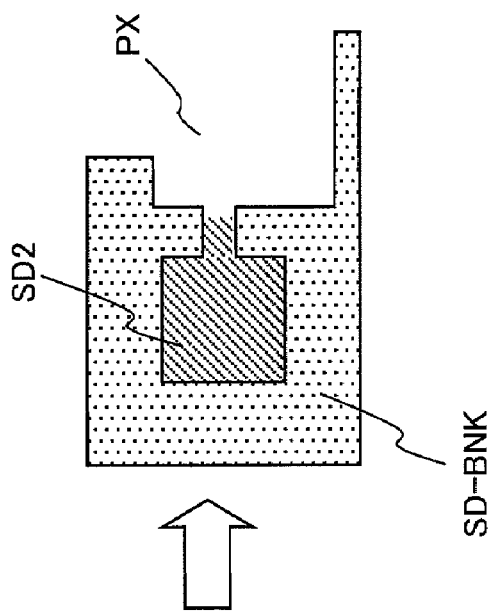

FIG. 10 is given to explain the formation of the separation pattern in Embodiment 3 of the present invention. As shown in FIG. 10(a), the source/drain bank SD-BNK on the drain electrode SD2 is provided with a narrow groove to form the separation pattern SPP in Embodiment 3. A conductive ink for the source drain is coated on the source-drain bank SD-BNK. In this case, as shown in FIG. 10(b), the coated conductive ink flows to the narrow groove to form the separation pattern SPP and is coated almost over the entire narrow groove. The coated film is thinner than the source electrode SD1.

Figure 10C:
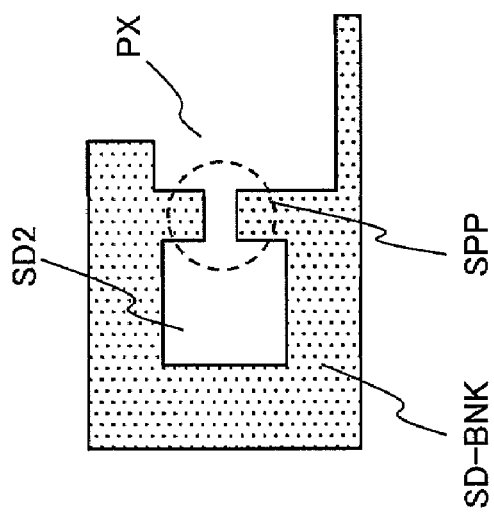

Then, as shown in FIG. 10(c), the conductive ink for the pixel electrode is coated on the pixel region. The conductive ink flows into the narrow groove to form the separation pattern SPP, and it is superimposed on the ink for the source electrode SD1 or it is mixed with the ink for the source electrode SD1, and it is turned to an ink film similar to the ink film for the source electrode SD1. By baking this, a structure is obtained where the pixel electrode and the drain electrode SD2 are connected with each other as shown in FIG. 7(b).

Figure 11:
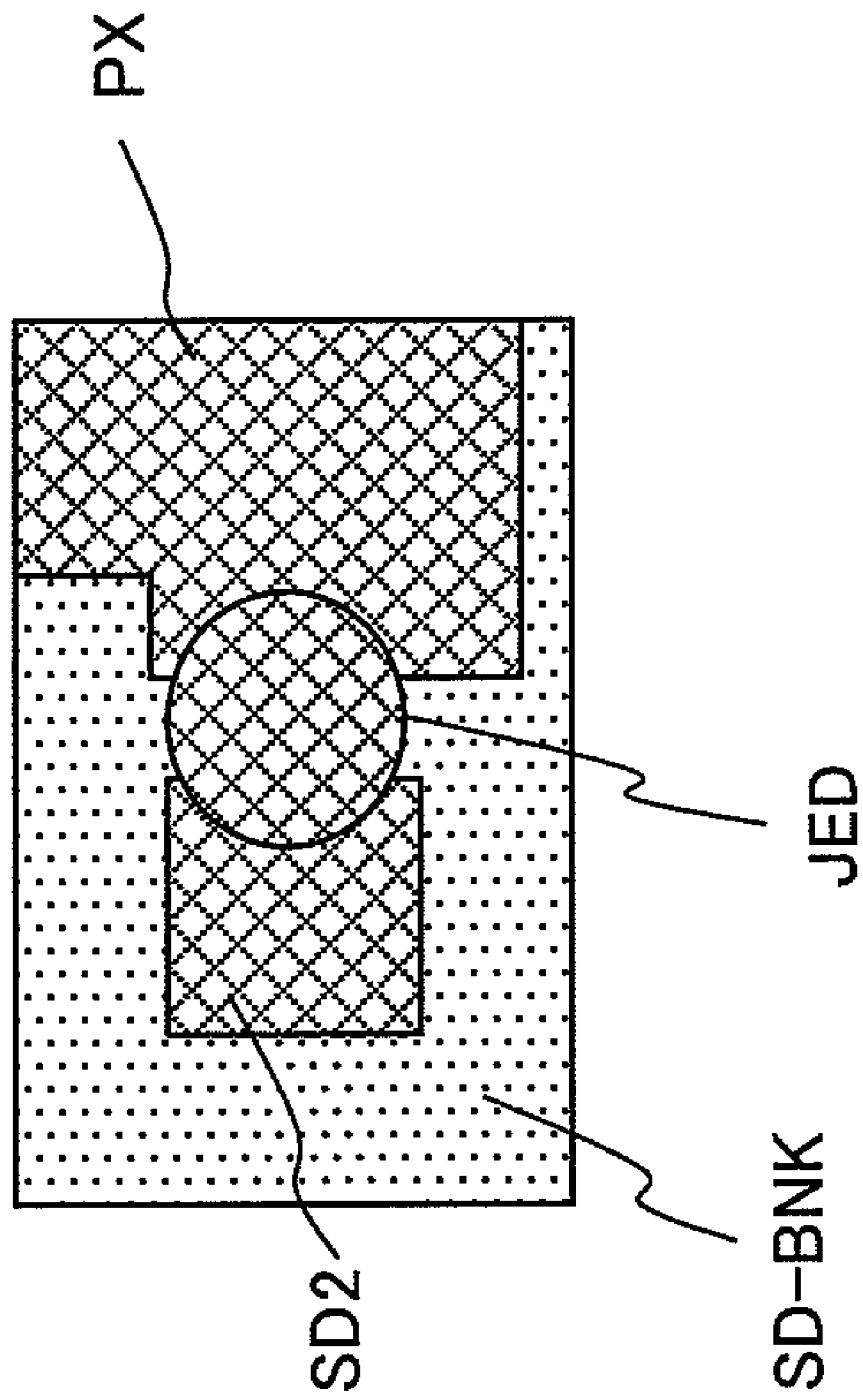
FIG. 11 is a drawing to explain another structure example of SPP portion of the separate pattern shown in FIG. 10.

FIG. 11 is a drawing to explain another structure example of the separation pattern SPP shown in FIG. 10. In FIG. 11, a connection electrode JED similar to that of Embodiment 2 is formed by ink jet method on the separation pattern SPP shown in FIG. 10(c). As a result, the reliability is improved in the electrical connection on the separation pattern SPP.

According to Embodiment 3, in addition to the effects obtained in Embodiment 1, there is no need to have the bank for forming the pixel electrode PX, similar to Embodiment 2. And it is possible to obtain a liquid crystal display device with high brightness and with good color reproducibility.

Embodiment 4

Figure 12A:
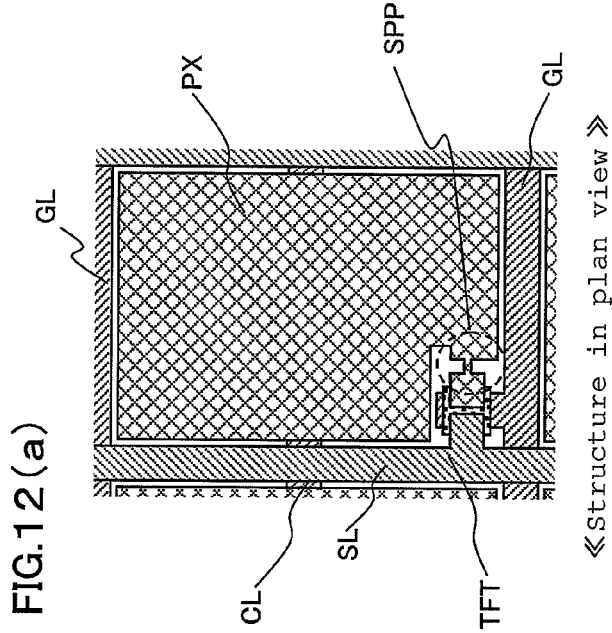
FIG. 12 represents drawings to explain one pixel of a first substrate (a thin-film transistor substrate) of a liquid crystal display panel of Embodiment 4 of the liquid crystal display device of the present invention.
Figure 12B:
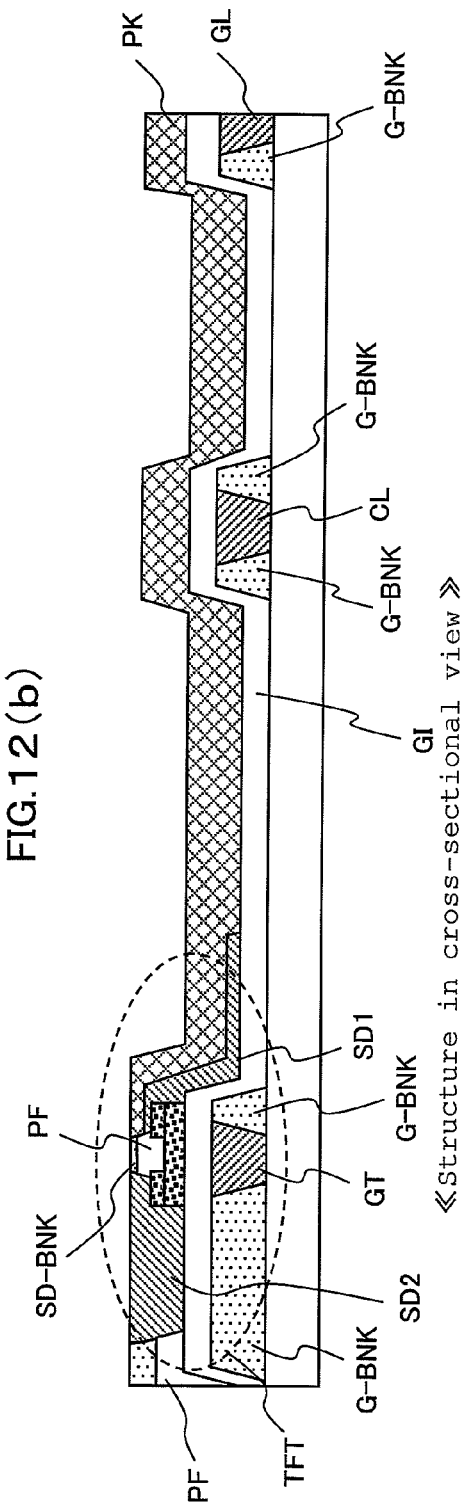
Figure 13:
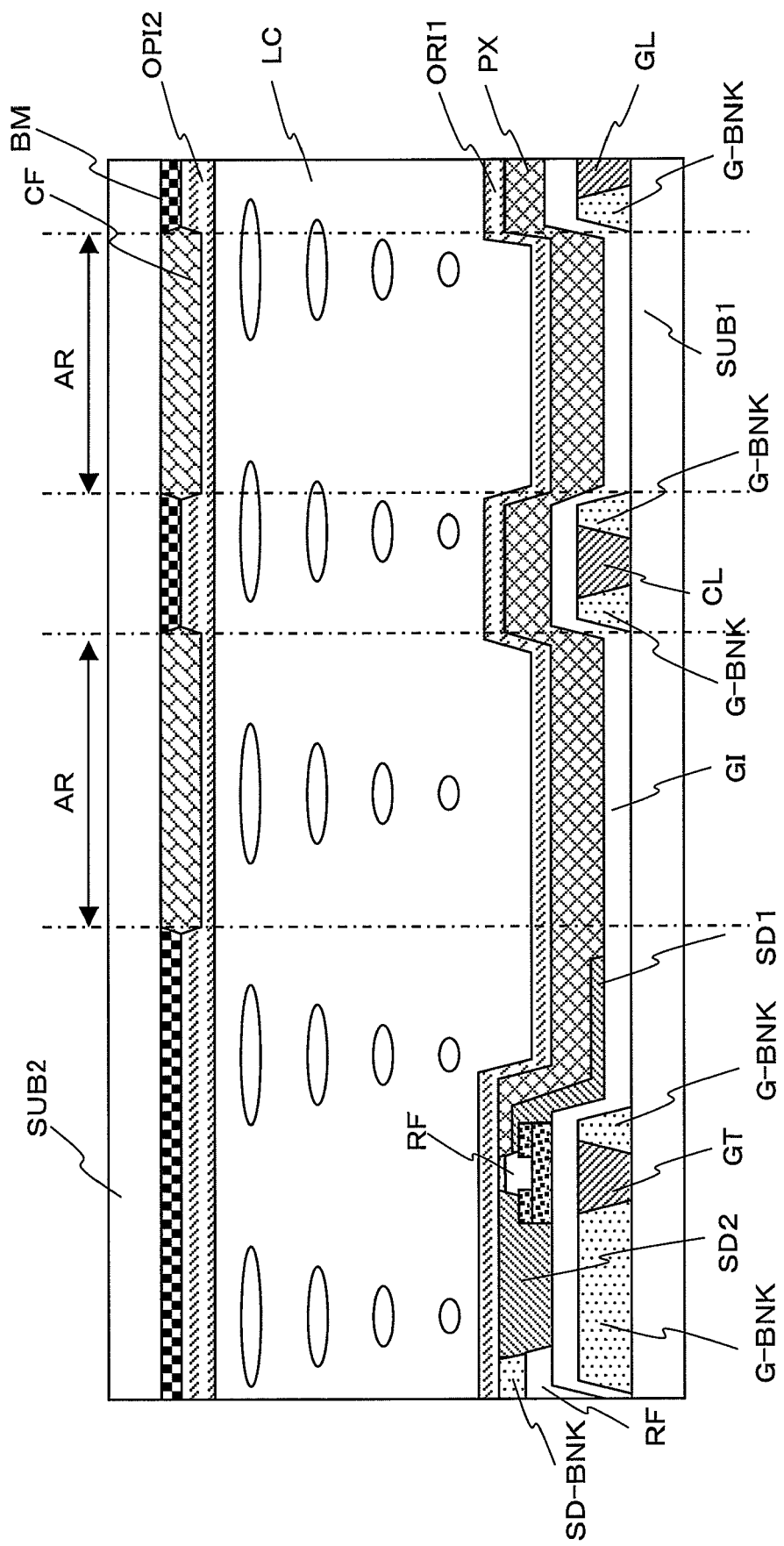
FIG. 13 is a schematical drawing to show cross-section of one pixel of a liquid crystal display panel prepared by attaching a second substrate, i.e. a counter substrate, to the first substrate shown in FIG. 12(b) and by sealing a liquid crystal between the two substrates.

FIG. 12 represents drawings to explain one pixel of a first substrate (a thin-film transistor substrate) of a liquid crystal display panel of Embodiment 4 of the present invention. FIG. 12(a) is a plan view, and FIG. 12(b) is a cross-sectional view along the line A-A' in FIG. 12(a). FIG. 13 is a schematical drawing to show cross-section of one pixel of the liquid crystal display panel prepared by attaching a second substrate, i.e. a counter substrate, to the first substrate shown in FIG. 12(b) and by sealing a liquid crystal between the two substrates. To facilitate the explanation, a counter electrode on the second substrate is not shown in FIG. 13. FIG. 14 represents plan views to sequentially explain a process for manufacturing the first substrate in Example 4.

The structure of Embodiment 4 is approximately the same as that of Embodiment 3. The pixel electrode PX and the drain electrode SD2 are connected with each other by the separation pattern SPP. It is different from Embodiment 3 in that, as shown in the cross-sectional views of FIG. 12 and FIG. 13 and as shown in FIG. 14(e), the source bank SD-BNK is prepared before the etching of the protective film PF, and the etching for the protective film PF is performed using the source bank SD-BNK as a mask.

Similarly to Embodiment 3, according to Embodiment 4, there is no need to have the bank for forming the pixel electrode PX. As a result, it is possible to obtain a liquid crystal display device with high brightness and with good color reproducibility.

Figure 16:
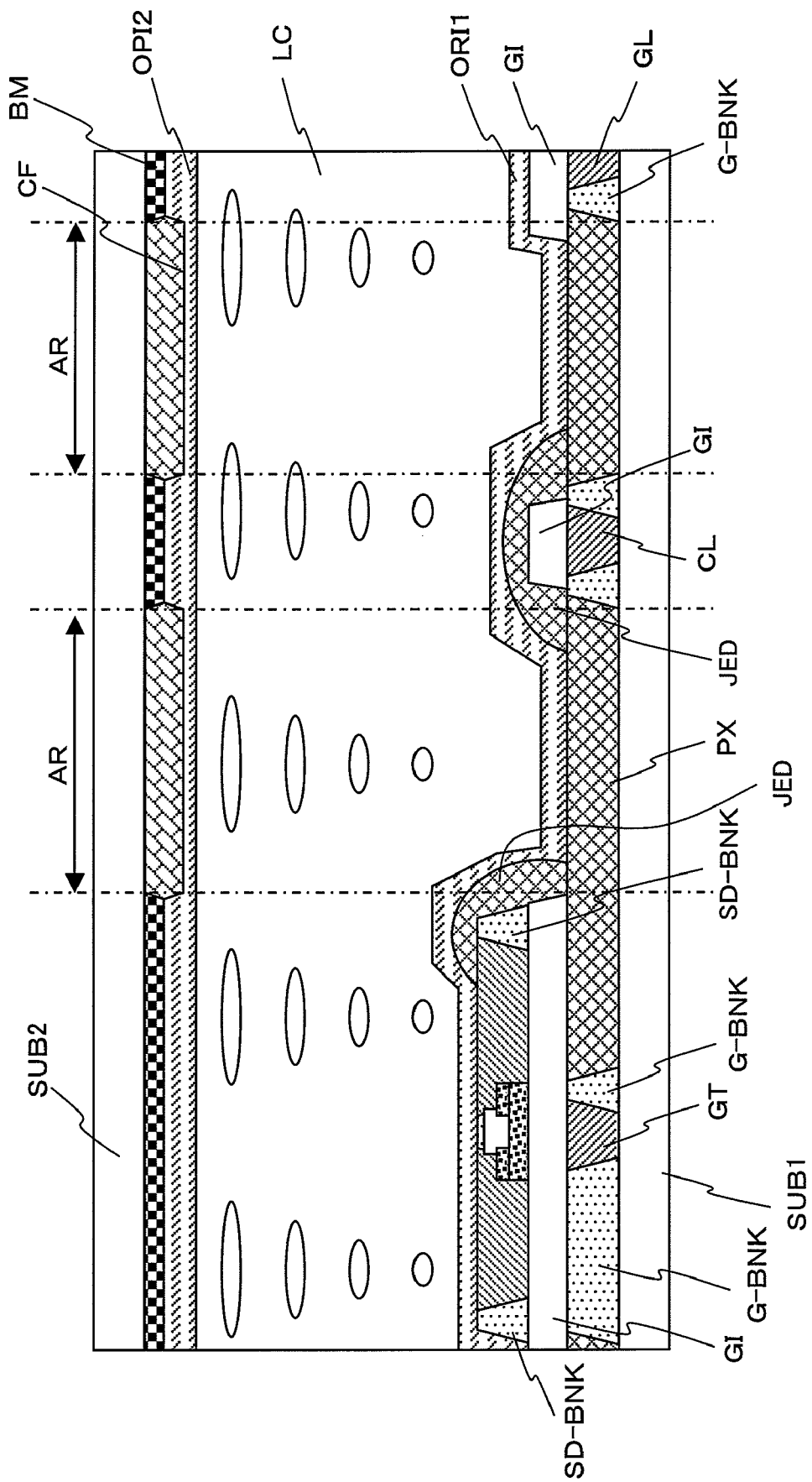
FIG. 16 is a schematical drawing to show cross-section of one pixel of a liquid crystal display panel prepared by attaching a second substrate, i.e. a counter substrate, to the first substrate shown in FIG. 15(b) and by sealing a liquid crystal between the two substrates.

FIG. 15 represents drawings to explain one pixel of a first substrate (a thin-film transistor substrate) of a liquid crystal display panel of Embodiment 5 of the present invention. FIG. 15(a) is a plan view, and FIG. 15(b) is a cross-sectional view along the line A-A' in FIG. 15(a). FIG. 16 is a schematical drawing to show cross-section of one pixel of the liquid crystal display panel prepared by attaching a second substrate, i.e. a counter substrate, to the first substrate shown in FIG. 15(b) and by sealing a liquid crystal between the two substrates. To facilitate the explanation, a counter electrode on the second substrate is not shown in FIG. 16. FIG. 17 represents plan views to sequentially explain a process for manufacturing the first substrate in Embodiment 5.

Embodiment 5 is characterized in that the pixel electrode PX is directly formed on inner surface of the first substrate SUB1. Also, in Embodiment 5, the drain electrode SD2 and the pixel electrode PX of the thin-film transistor are connected via a first connection electrode JED1. Also, a second connection electrode JED2 is used to connect between the pixel electrode separated by the capacity line CL. The first connection electrode JED1 and the second connection electrode JED2 are also formed by dropping and coating the ink by the ink jet method.

As shown in FIG. 15, FIG. 16, and FIG. 17, the gate banks G-BNKs for forming the gate line GL, the gate electrode GT, and the capacity line CL are formed on inner surface of the first substrate SUB1. All of the gate banks are arranged at the positions where these are concealed by the light shielding film BM on the second substrate SUB2. Using the gate banks G-BNKs, the ink is coated on the gate electrode GT, the capacity line CL, and the gate line GL by ink jet method, and then, baking is performed.

Next, using the gate banks G-BNKs, the conductive ink is coated on the display area AR for the pixel to form the pixel electrode by ink jet method. After baking, the pixel electrode PX is prepared. Then, silicon nitride SiN is deposited by vacuum evaporation, and the gate insulator film GI is prepared. Patterning is performed to leave the portion for forming the thin-film transistor TFT to cover the gate electrode GT and the upper layer to cover the capacity line CL, and the pixel electrode PX in the display area is exposed. Silicon film and n+silicon film are formed, and the islands of the silicon film and the n+silicon film are formed by photolithographic process and by etching. By fabricating the n+silicon film, a channel is prepared, and a protective film is filled to cover the channel.

The islands of the silicon film and the n+silicon film are formed to cover the gate insulator film GI, and the source bank SD-BNK is formed on the source line SL, the source electrode SD1 and the drain electrode SD2 in the region of the thin-film transistor. With a region enclosed by the source bank SD-BNK, a conductive ink is coated by ink jet method. After baking, the source line SL, the source electrode SD1 and the drain electrode SD2 are formed.

As shown in FIG. 15, FIG. 16 and FIG. 17(g), the conductive ink is coated to cross over the drain electrode SD2 and the pixel electrode PX, and a connection electrode JED1 to electrically connect these two is prepared. Also, by coating the conductive ink on the capacity line CL by ink jet method, a connection electrode JED2 to electrically connect between the pixel electrodes separated by the capacity line CL is prepared. When the connection electrode JED2 is formed, it is desirable to coat the ink sequentially so that a plurality of ink drops are superimposed one upon another along the capacity line CL as shown in FIG. 17(g). As the conductive ink for preparing the connection electrode JED1 and JED2, it is desirable to use a solution with transparent conductive particles such as ITO similar to the one used for forming the pixel electrode PX.

According to Embodiment 5, neither the gate insulator film on lower layer of the pixel electrode PX nor the resin layer for forming the bank is used. As a result, transmissivity is improved. Also, no coloring occurs due to the baking of the lines and the electrodes prepared by ink jet method. Thus, it is possible to provide a liquid crystal display device with high brightness and with good color reproducibility. Further, by simplifying the process, the liquid crystal display device can be produced at relatively low cost.

Embodiment 6

FIG. 18 represents drawings to explain one pixel of a first substrate (a thin-film transistor substrate) of a liquid crystal display panel of Embodiment 6 for the liquid crystal display device of the present invention. FIG. 18(a) is a plan view, and FIG. 18(b) is a cross-sectional view along the line A-A' in FIG. 18(a). FIG. 19 represents plan views of one pixel to sequentially explain a process for manufacturing the first substrate of Example 6.

In FIG. 18, there are provided a plurality of gate lines GL formed on the first substrate SUB1, for which glass is used as a suitable material, and a plurality of source lines SL to cross the gate lines, and one pixel is provided in a region (pixel region) enclosed by two gate lines GL and two source lines SL. Regarding the source electrode and the drain electrode, description will be given here on the source line SL. One pixel is made up by the thin-film transistor TFT and the pixel electrode PX.

In this Embodiment, too, a capacity line CL is arranged in a direction parallel to the gate by traversing approximately the central portion in the region where the source electrode is formed. The thin-film transistor TFT is arranged near the intersection of the gate line GL and the source line SL. The thin-film transistor TFT comprises a gate electrode GT extending from the gate line, a semiconductor film SI, a source electrode SD1, and a drain electrode SD2. To prepare the semiconductor film SI, a contact layer of n+silicon is laminated on upper layer of silicon, and a channel is formed by removing the central portion of this contact layer. A protective film PF is filled in the channel.

In FIG. 18(b), there are provided the gate line GL, the gate electrode GT, and the gate bank G-BNK, which is a bank to form the capacity line CL, on the first substrate SUB1. The gate-banks G-BNKs are arranged only within the region of the thin-film transistor TFT, in the portion where the capacity line CL is formed, and on the portion where the gate line GL is formed. To the drain electrode SD2 of the thin-film transistor TFT, the pixel electrode PX made of a transparent conductive film, for which ITO is used as a suitable material, is connected via the separation pattern SPP.

To prepare the gate electrode GT of the thin-film transistor TFT, a conductive ink, for which silver (Ag) solution is used as a suitable material, is coated by ink jet method in a groove prepared by the gate bank G-BNK in the region where the thin-film transistor is formed. The capacity line CL is formed by the gate bank G-BNK arranged in the pixel region. The gate line GL is prepared by the gate bank G-BNK outside of the pixel region. The gate insulator film GI is prepared on it. As shown in FIG. 19(c) as given later, the source electrode SD1 and the drain electrode SD2 are formed by SD bank SD-BNK provided on the gate insulator film GI. As described later, upper portions of the gate-banks G-BNKs are at such positions that these are concealed by the light shielding film (black matrix) on the second substrate.

In the positional relation with the second substrate SUB2, similarly to FIG. 8 as given to explain Embodiment 3, the light shielding film BM of the second substrate SUB2 is arranged at a position where SD banks to be the regions of the thin film transistor TFT and the gate line GL are concealed, and also at a position where the gate-bank G-BNK to form the capacity line CL is concealed.

In this Embodiment, too, the capacity line CL is arranged in the region of the pixel electrode. A display area AR of pixel is separated at a portion to conceal the gate bank G-BNK where the capacity line CL is formed on upper layer of the capacity line CL. Light shutter effect of the liquid crystal LC becomes effective in the display area AR. In this Embodiment, the bank to form the pixel electrode PX is not provided, and the pixel electrode PX is formed by using the SD bank SD-BNK. Thus, a process to prepare the bank for pixel electrode is not needed. The pixel electrode PX is connected to the drain electrode SD2 via the separation pattern SPP. The separation pattern is the same as the one explained in FIG. 10.

This Embodiment is characterized in that etching process for the silicon film S and the n+silicon film nS is performed together under half-exposure to light. Also, the source bank SD-BNK is processed by half-exposure to light. The protective film to cover the channel and the gate insulator film are processed together. As a result, the number of processes is extensively reduced. FIG. 19 represents plan views of one pixel to sequentially explain a process for manufacturing the first substrate of Embodiment 6 of the present invention, and FIG. 20 and FIG. 21 each represents drawings to explain the features of Embodiment 6 of the present invention. FIG. 20 represents drawings to explain the etching process of the silicon film S and the n+silicon film nS, and FIG. 21 represents drawings to explain the etching process for the protective film and the gate insulator film to cover the source bank and the channel subsequent to the process of FIG. 20.

Figure 20A:
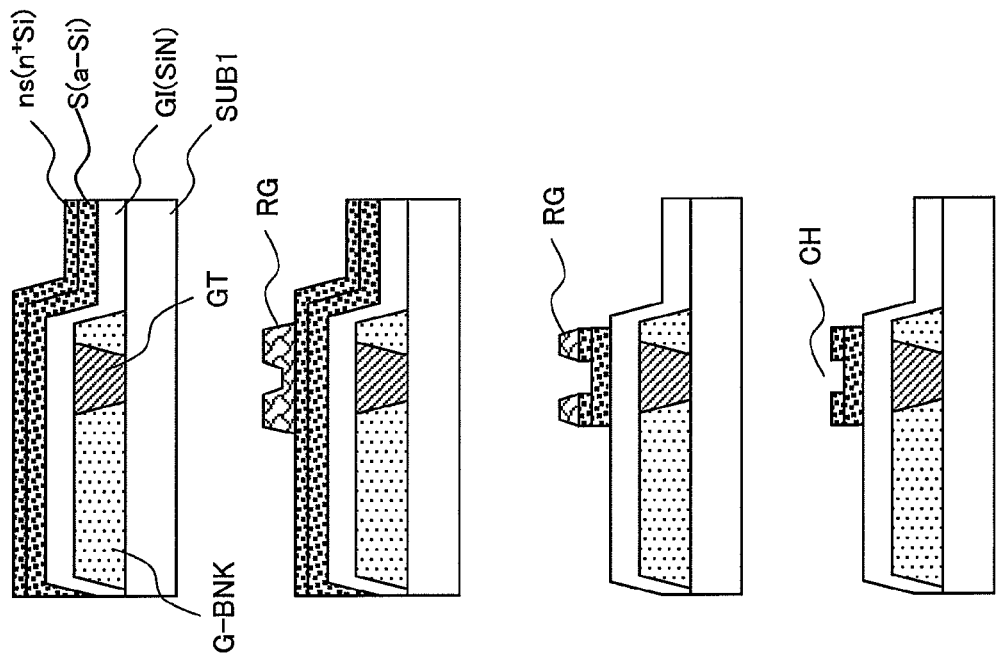
FIG. 20 represents drawings to explain a process of etching of silicon film S and $n^+$silicon film nS for explaining features of Embodiment 6 of the present invention.
Figure 20B:
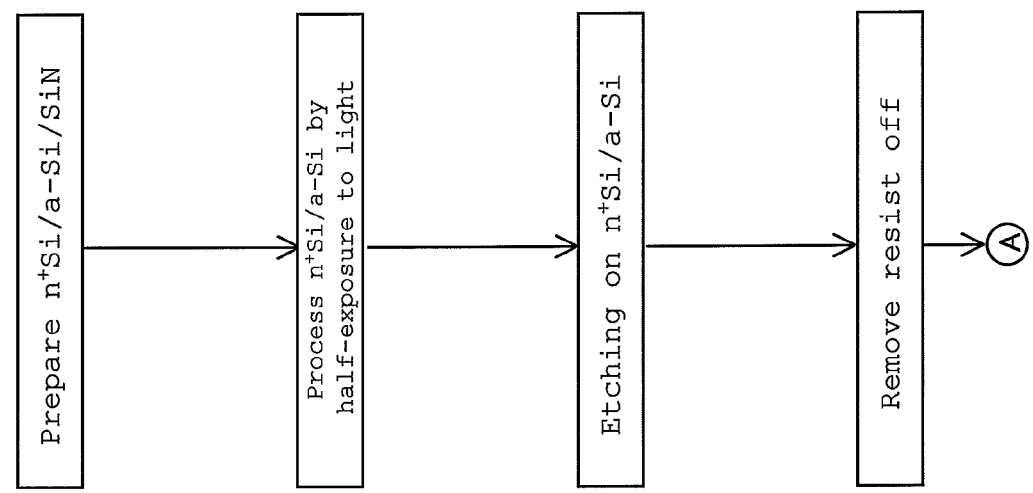

FIG. 20(a) represents the process, and FIG. 20(b) shows cross-sections of the thin-film transistor on the first substrate to match each of the processes shown in FIG. 20(a). First, on the gate insulator film GI of silicon nitride (SiN) deposited on the first substrate SUB1, silicon (amorphous silicon: a-Si) film S and n+silicon film nS are deposited. Then, photoresist is coated on the silicon film S and the n+silicon film nS. On the photoresist, island-like silicon semiconductor film is processed by full exposure to light using a half-exposure mask, and the channel is processed by half-exposure to light. By developing, the photoresist RG as desired is left.

Using the photoresist RG as a mask, etching is performed on the silicon film and the n+silicon film nS. Using the photoresist RG with patterning by half-exposure to light as an etching mask, etching is performed. As a result, the island-like semiconductor film, which is to become an active layer of the thin-film transistor, is left, and the n+silicon film nS on upper layer of the channel is removed. By removing the photoresist RG off, an island-like semiconductor layer with the channel exposed is provided.

Figures 21A, 21B, 21C:
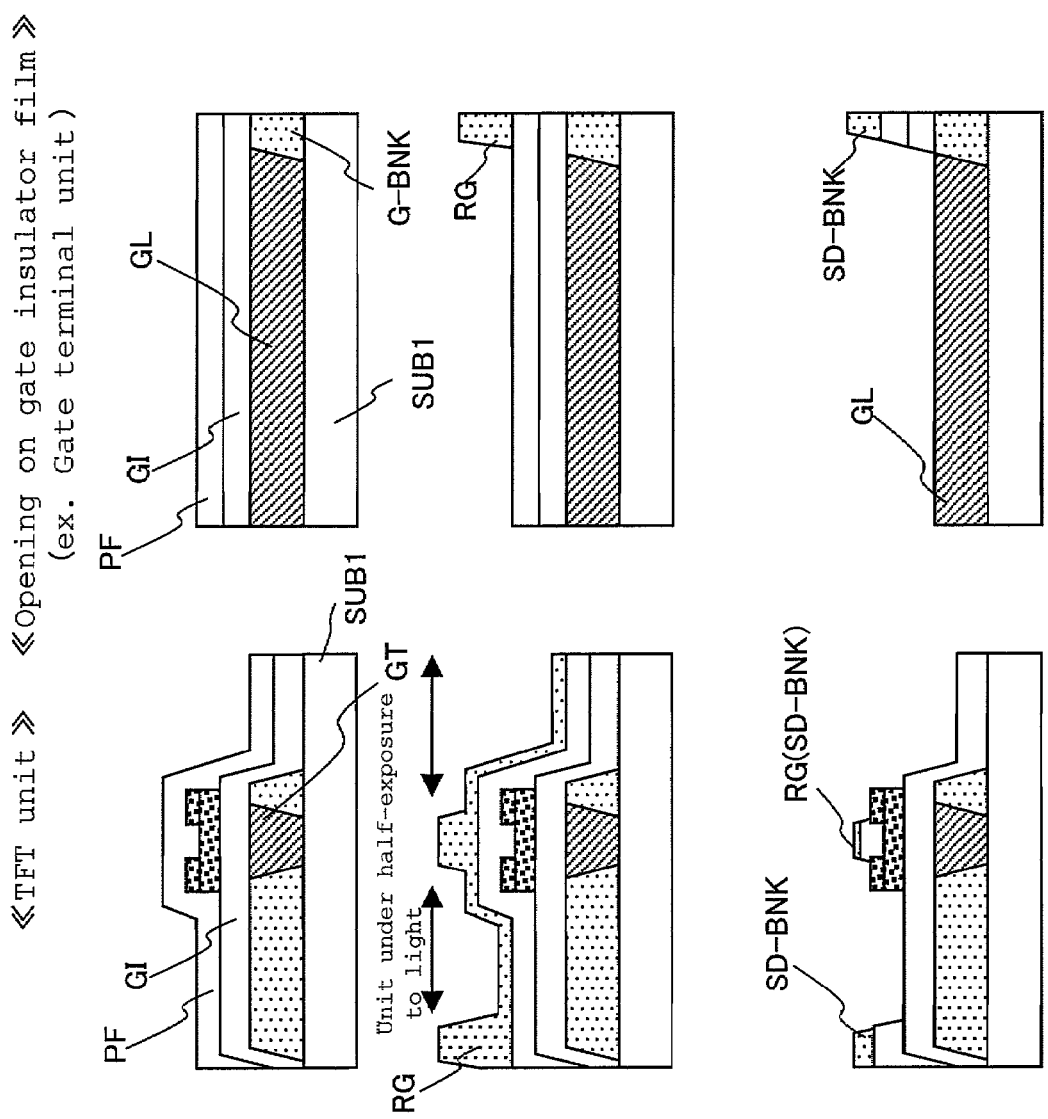
FIG. 21 represents drawings to explain etching process of a protective film and a gate insulator film to cover source bank and channel portion subsequent to FIG. 20 to explain the features of Example 6 of the present invention.

FIG. 21(a) shows the process, and FIG. 21(b) represents cross-sectional views of the thin-film transistor (TFT) on the first substrate to match each of the processes shown in FIG. 21(a). FIG. 21(c) represents cross-sectional views each showing an opening of the gate insulator film such as gate terminal. After the process shown in FIG. 20, a protective layer PF is formed to cover the gate insulator film including the island-like semiconductor film. A photoresist RG to serve also as the source bank is coated on the protective film PF.

The photoresist RG is processed by half-exposure to light. In this half-exposure, an exposure mask is used so that the opening of the gate insulator film such as gate terminal to remove the portion up to the gate insulator film is processed by full-exposure, that the portion to be the source-bank SD-BNK and a portion of the channel CH are processed by non-exposure to light, and that a portion to leave the gate insulator film GI is processed by half-exposure to light. In this case, a negative type photoresist is used, in which the exposed portion is developed, dissolved and removed.

After the half-exposure to light, the photoresist RG is developed. By etching, a protective film PF is left on the portion to be the source bank SD-BNK and the portion of the channel CH in the thin film transistor region (TFT region). On the opening of the gate insulator film, not only the protective film PF but also the gate insulator film GI of the lower layer is removed. By baking this, the source bank SD-BNK is prepared. Also, the same insulator layer as the source bank SD-BNK remains on the protective film PF of the channel CH.

Then, lyophilic processing is performed on the portion of the source bank SD-BNK to form the source electrode, the source line, the drain electrode and the pixel electrode, and liquid repellent processing is performed on the other portions. The lines and the electrodes are prepared by coating of ink jet and by baking.

According to Embodiment 6, in addition to the effects provided by Embodiment 3, a liquid crystal display device with high brightness and with good color reproducibility can be obtained at a lower cost.

FIG. 22 represents drawings each to explain detailed cross-section of the connection electrode as shown in FIG. 14, FIG. 15, FIG. 16, etc. respectively. In FIG. 14, FIG. 15, FIG. 16, etc., the connection electrode JED is given as shown in FIG. 22(a). Specifically, the pixel electrode PX and the drain electrode SD2 are electrically connected by the connection electrode JED, which comprises a conductive film coated by ink jet method. In FIG. 22(a), the connection electrode JED is shown as if it crosses over the graded step of the gate insulator film GI and the source bank SD-BNK from the pixel electrode PX. It appears that this crossing-over is difficult to achieve and sufficient connection is not attained. In fact, however, the connecting portion of the connection electrode JED is big enough to absorb the graded step, and malfunction such as insufficient connection on the graded step does not occur.

In the above, general description has been given on the arrangement on the first substrate side. However, if the positioning with the second substrate is deviated, the bank may be forced out from the region of the light shielding film and this may give influence on numerical aperture or on contrast. In the following, description will be given on the arrangement to suppress the influence on display quality due to the deviation of positioning between the bank and the light shielding film. Here, description will be given by taking an example on the capacity line CL and the light shielding film BM.

FIG. 23 represents a drawing to explain a general design example of the light shielding film. As shown in FIG. 23(a), it is supposed that a capacity line CL with a width WL is arranged on the first substrate SUB1, and that a light shielding film BM with a width WB and a color filter CF are provided on the second substrate SUB2. The width WB of the light shielding film BM is set to a value wider than the capacity line CL in an extent "d" on both sides respectively to give a positioning tolerance. That is, "Width WB of the Light Shielding Film BM≈[Width WL of Capacity line CL+Tolerance d×2]". If the positioning deviation is 2d at the maximum, as shown in FIG. 23(b), the capacity line CL is not deviated from the light shielding film BM and is not forced out to the display area.

Figure 24A:
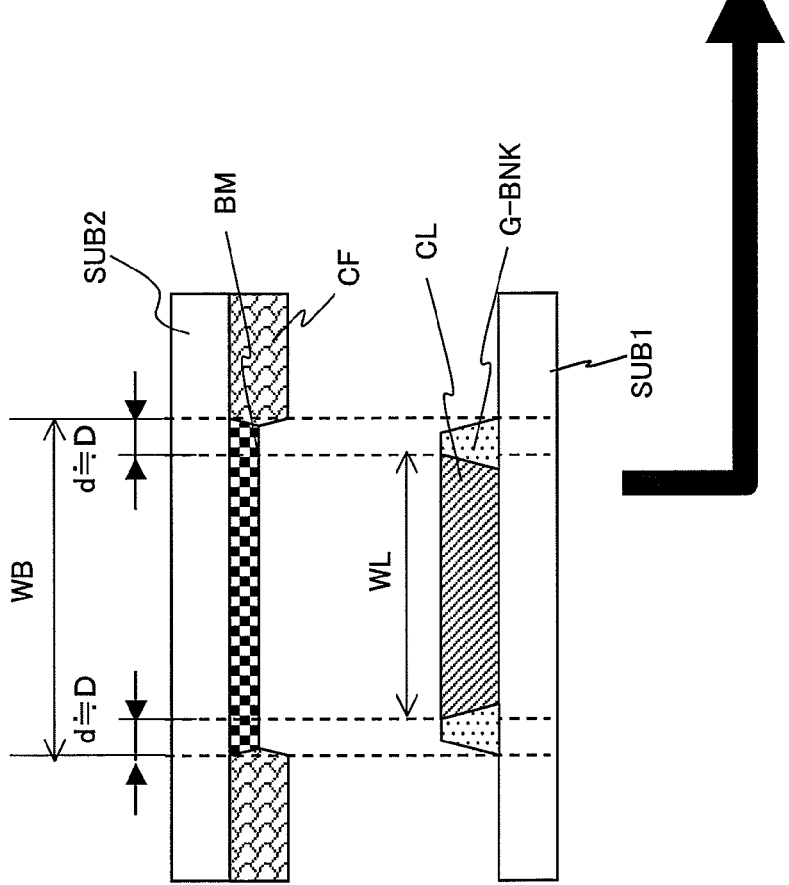
FIG. 24 represents drawings to explain a design example of a capacity line and a light shielding film formed on the gate bank of the present invention.
Figure 24B:
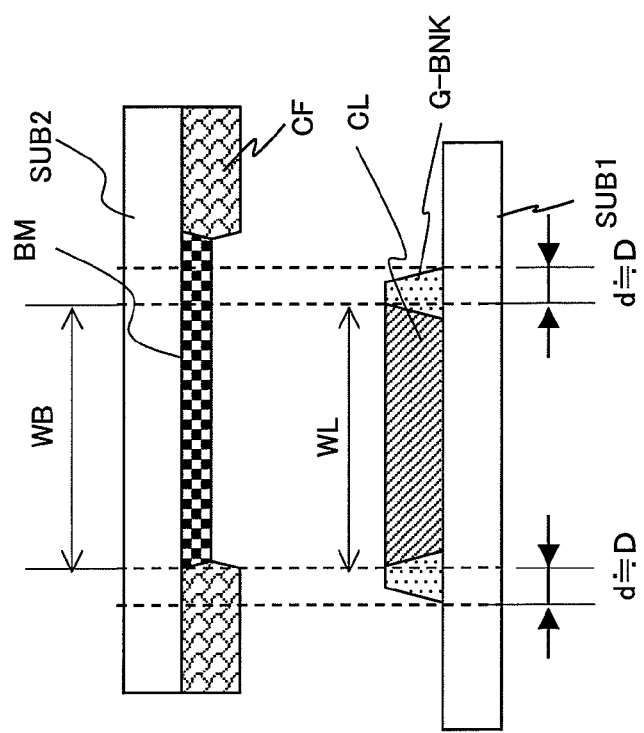
Figure 27:
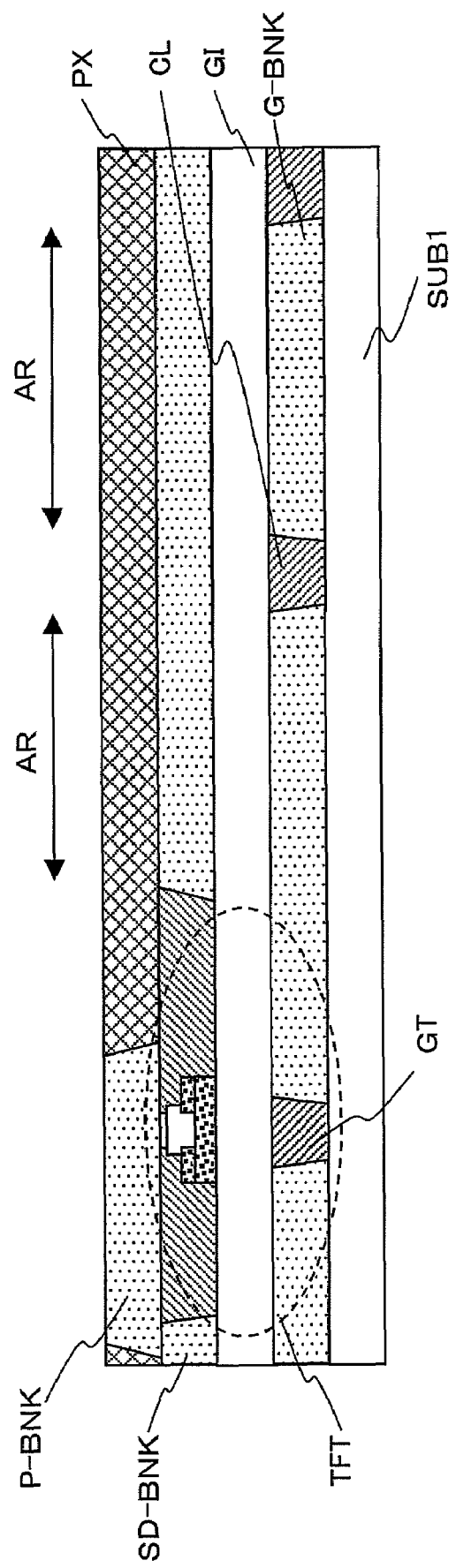
FIG. 27 is a cross-sectional view schematically illustrating an example of a structure formed on inner surface of the first substrate by using ink jet method.
Figure 28:
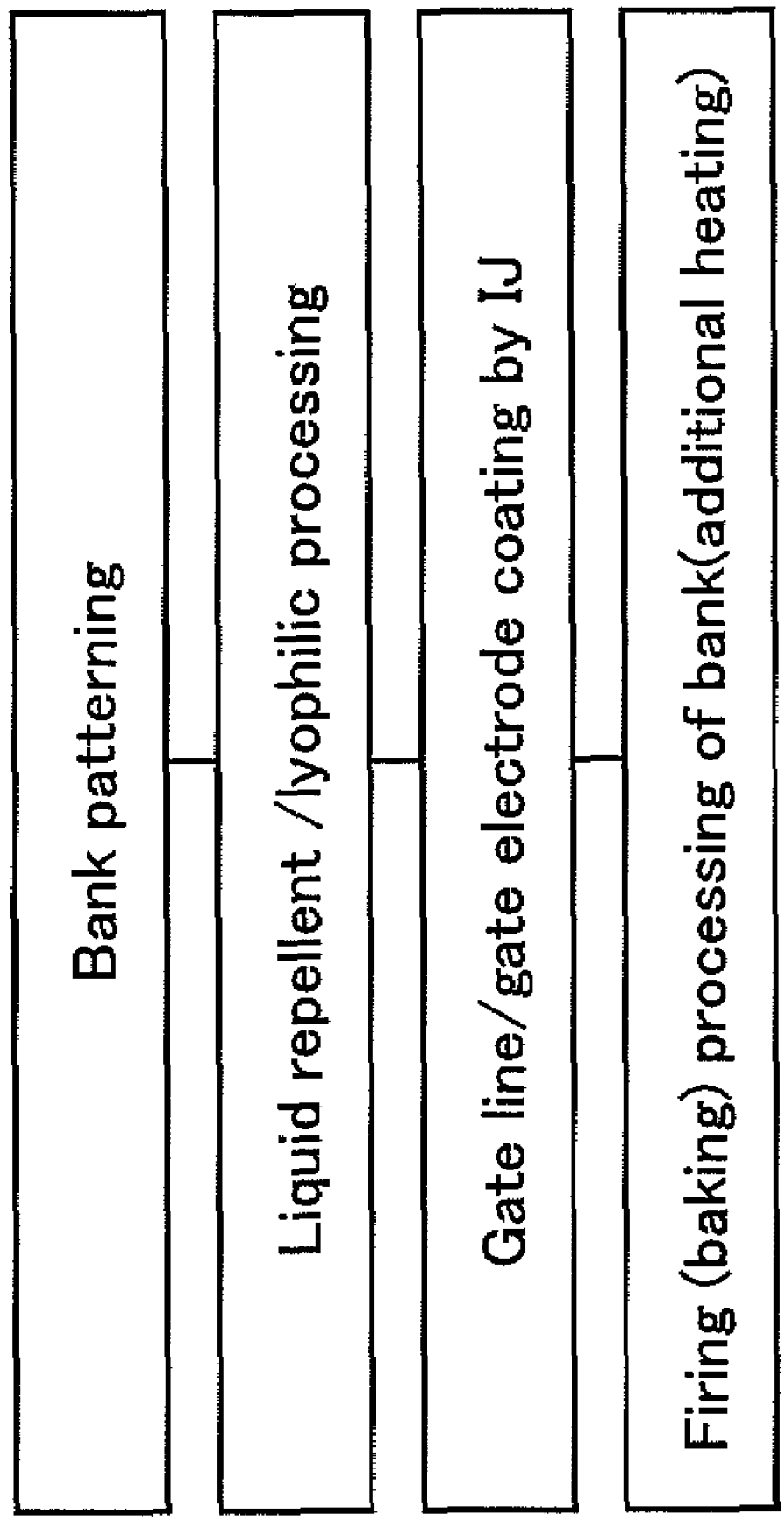
FIG. 28 is a flow chart to explain a process for forming lines and the like using banks.

FIG. 24 represents a drawing to explain a design example of the capacity line and the light shielding film formed by the gate bank in the present invention. As shown in FIG. 24(a), on the first substrate SUB1 a capacity line CL with a width WL is formed by a pair of gate banks G-BNKs. On the second substrate SUB2, a light shielding film BM with a width WB and a color filter CF are arranged. The width WB of the light shielding film BM is arranged to be wider than the capacity line CL in an extent "d" on both sides respectively as the positioning tolerance. The width D of the gate bank G-BNK is set to approximately the same value as the positioning tolerance d.

Specifically, "Width WB of the Light Shielding Film BM≈[Width WL of Capacity Line CL+Tolerance d (+D)×2]". If the positioning deviation is 2d (≈2D) at the maximum, even when one of the gate banks G-BNKs on both sides of the capacity line CL may be deviated from the light shielding film BM and may be forced out to the display area, numerical aperture is not decreased because the gate banks G-BNKs are translucent.

FIG. 25 represents drawings to explain another design example of the capacity line and the light shielding film shown in FIG. 24. This design example is the same as the design example shown in FIG. 24 except that the gate banks G-BNKs are designed as light absorptive (light shielding) or low light shielding type. In this example, the gate bank G-BNK has light shielding property. As a result, numerical aperture is slightly decreased while the contrast is increased.

FIG. 26 represents drawings still another design example of the capacity line and the light shielding film formed by the gate banks in the present invention. In this design example, as shown in FIG. 26(a), a capacity line CL with a width WL is formed by a pair of gate banks G-BNKs on the first substrate SUB1. On the second substrate SUB2, a light shielding film BM with a width WB and a color filter CF are formed. The width WB of the light shielding film BM is designed to be wider than the capacity line CL by the sum up of a value "d" and of a value "D" the width of the gate bank G-BNK on both sides respectively as the positioning tolerance. The width D of the gate bank G-BNK is set to a value approximately equal to the positioning tolerance "d".

Specifically, "Width WB of Light Shielding Film BM≈[Width WL of Capacity Line CL+Tolerance d×2+Width D of Gate Bank G-BNK×2]"(where d≈D). If the position deviation is 2d (≈2D) at the maximum, as shown in FIG. 26(b), even when one of the gate banks G-BNKs on both sides of the capacity line is deviated from the light shielding film BM and may be forced out to the display area, numerical aperture is not decreased because the gate banks G-BNK are translucent.

The light-absorbent (light shielding) or low light shielding gate banks G-BNKs as explained in connection with FIG. 25 can be applied to the design examples in the above Embodiments and in the design examples of the light shielding film. The connection electrode as described above may be made of the same conductive material as that of the pixel electrode or may be made of the same material as the source/drain material or may be made of other conductive material. The protective film provided on upper layer of the thin-film transistor is not limited to silicon nitride, and it may be an organic insulator film or may be used simultaneously with the bank.

What is claimed is:

1. A liquid crystal display device, comprising a first substrate with thin-film transistor arranged for each of a plurality of pixels in matrix arrangement, a second substrate where color filters with a plurality of colors formed to match the pixels and a light shielding film and a counter electrode are arranged, and a liquid crystal display panel prepared by attaching said first substrate and said second substrate and by sealing a liquid crystal between said substrates, wherein there are provided on said first substrate:
   a gate line where a gate electrode of said thin-film transistor is arranged on a part thereof and a scan signal is applied;
   a gate insulator film formed to cover said gate line;
   a semiconductor layer formed in island-like shape on said gate insulator film and constituting an active layer of said thin-film transistor;
   a source electrode and a drain electrode provided on said gate insulator film and connected to said semiconductor layer;
   a data line for preparing said source electrode on a part thereof and for supplying a display signal; and
   a pixel electrode connected to said drain electrode;
   said gate line and said gate electrode, said source electrode and said drain electrode, and said pixel electrode are formed by baking a conductive solution coated on a region enclosed by bank-like members of insulator film by ink jet method; and
   said bank-like members of the insulator film are arranged only in the region of said light shielding film on said second substrate.

2. A liquid crystal display device according to claim 1, wherein:
   said pixel electrode is formed in a region enclosed by the bank-like members arranged on upper layer of said source electrode and said drain electrode in each region of adjacent light shielding film;
   said pixel electrode and said drain electrode are separated by the bank-like members arranged on said gate insulator film; and
   said drain electrode and said pixel electrode are connected via a contact hole.

3. A liquid crystal display device according to claim 1, wherein:
   said pixel electrode is arranged on the same layer as said source electrode and said drain electrode, and is separated from said source electrode and said drain electrode by the bank-like members arranged on said gate insulator film; and
   said pixel electrode and said drain electrode are connected by a conductive connection electrode crossing over said two electrodes and prepared by ink jet coating.

4. A liquid crystal display device according to claim 1, wherein:
   said pixel electrode is prepared on the same layer as said source electrode and said drain electrode; and
   said pixel electrode and said drain electrode have linear separation patterns to connect the two electrodes.

5. A liquid crystal display device according to claim 3, wherein said connection is made by a conductive connection electrode crossing over said pixel electrode and said drain electrode and prepared by ink jet coating on said linear separation pattern.

6. A liquid crystal display device according to claim 1, wherein:
   said pixel electrode is on the same layer as said source electrode and said drain electrode, and has a protective film on lower layer of the bank-like member on the source electrode side and on lower layer of the bank-like member of a channel of said semiconductor layer; and
   said pixel electrode and said drain electrode have linear separation patterns to connect these two electrodes.

7. A liquid crystal display device according to claim 6, wherein said connection is made by a connection electrode crossing over said pixel electrode and said drain electrode and prepared by ink jet coating and baking on said linear separation pattern.

8. A liquid crystal display device according to claim 1, wherein:
   there is provided a capacity line on the same layer as said gate line in a region where said pixel electrode is arranged;
   said pixel electrode is separated to a first pixel electrode and a second pixel electrode by a bank-like member to form said capacity line and by a gate insulator film arranged on said bank-like member;
   said first pixel electrode and said drain electrode arranged on upper layer of said gate insulator film are connected by a first connection electrode prepared by ink jet coating and by baking to cross over said two electrodes; and
   said second pixel electrode and said first pixel electrode are connected by a second connection electrode prepared by ink jet coating and by baking to cross over between the two pixel electrodes.

9. A liquid crystal display device according to claim 8, wherein said capacity line is arranged in a direction parallel to said gate line.

10. A liquid crystal display device according to claim 8, wherein, when it is supposed that width of the light shielding film formed on said second substrate is WB, that width of said capacity line arranged on said first substrate is WL, and that positioning tolerance on both sides in width direction of said light shielding film and said capacity line is "d" respectively, the following relation exists: WB≈WL+2d.

11. A liquid crystal display device according to claim 8, wherein, when it is supposed that width of the light shielding film formed on said second substrate is WB, that width of said capacity line arranged on said first substrate is WL, that positioning tolerance on both sides in width direction of said light shielding film and said capacity line is "d" respectively, and that width of said bank-like member to form said capacity line is D, the following relation exists: WB≈WL+2D (where D≈d).

12. A liquid crystal display device according to claim 11, wherein said bank-like member to form said capacity line has light transmissivity equal to that of said light shielding film.

13. A liquid crystal display device according to claim 8, wherein when it is supposed that width of the light shielding film formed on said second substrate is WB, that width of said capacity line arranged on said first substrate is WL, that positioning tolerance on both sides in width direction of said light shielding film and said capacity line is "d" respectively, and that width of said bank-like member to form said capacity line is D, the following relation exists: WB≈WL+2D+2d.

* * * * *